(12) United States Patent
Kusaka et al.

(10) Patent No.: US 11,316,315 B2
(45) Date of Patent: Apr. 26, 2022

(54) FILTER ELEMENT, LASER DEVICE, FIBER LASER DEVICE, FILTER METHOD, AND METHOD FOR MANUFACTURING LASER DEVICE

(71) Applicant: FUJIKURA LTD., Tokyo (JP)

(72) Inventors: Hiroyuki Kusaka, Chiba (JP); Masahiro Kashiwagi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 136 days.

(21) Appl. No.: 16/962,985

(22) PCT Filed: Jan. 23, 2019

(86) PCT No.: PCT/JP2019/002027
§ 371 (c)(1),
(2) Date: Jul. 17, 2020

(87) PCT Pub. No.: WO2019/146627
PCT Pub. Date: Aug. 1, 2019

(65) Prior Publication Data
US 2020/0358243 A1 Nov. 12, 2020

(30) Foreign Application Priority Data
Jan. 23, 2018 (JP) .............................. JP2018-009235

(51) Int. Cl.
*H01S 3/30* (2006.01)
*H01S 3/00* (2006.01)
(Continued)

(52) U.S. Cl.
CPC .......... *H01S 3/0078* (2013.01); *H01S 3/0675* (2013.01); *H01S 3/10023* (2013.01);
(Continued)

(58) Field of Classification Search
CPC ........... H01S 3/094007; H01S 3/06787; H01S 3/10023; H01S 3/302; H01S 3/0078; H01S 3/0675; H01S 3/094003
See application file for complete search history.

(56) References Cited

U.S. PATENT DOCUMENTS

| 2003/0002138 A1* | 1/2003 | DeCusatis | ........... H01S 3/13013 |
| | | | 359/334 |
| 2004/0264977 A1* | 12/2004 | Yap | ........................ H03B 28/00 |
| | | | 398/161 |

(Continued)

FOREIGN PATENT DOCUMENTS

| CN | 101512851 A | 8/2009 |
| CN | 102081197 A | 6/2011 |

(Continued)

OTHER PUBLICATIONS

International Preliminary Report on Patentability issued in corresponding International Application No. PCT/JP2019/002027 dated Jul. 28, 2020 (12 pages).

(Continued)

*Primary Examiner* — Kinam Park
(74) *Attorney, Agent, or Firm* — Osha Bergman Watanabe & Burton LLP

(57) ABSTRACT

A fiber laser apparatus includes a pump light source that emits pump light; a pump delivery fiber that guides the pump light; an amplifying optical fiber that is optically coupled to the pump delivery fiber and guides laser light; and a filter element that causes more loss of light of a wavelength range that includes a peak wavelength of at least one of Stokes light and anti-Stokes light than the laser light. The Stokes light and anti-Stokes light result from four-wave mixing involving a plurality of guide modes in a multi-mode fiber that guides the laser light. The filter element is disposed (Continued)

between: the pump delivery fiber and the amplifying optical fiber, the amplifying optical fiber and the multi-mode fiber, or at the multi-mode fiber.

14 Claims, 10 Drawing Sheets

(51) Int. Cl.
    *H01S 3/10* (2006.01)
    *H01S 3/067* (2006.01)
    *H01S 3/094* (2006.01)

(52) U.S. Cl.
    CPC .......... *H01S 3/302* (2013.01); *H01S 3/06787* (2013.01); *H01S 3/094003* (2013.01); *H01S 3/094007* (2013.01)

(56) References Cited

U.S. PATENT DOCUMENTS

| | | | |
|---|---|---|---|
| 2005/0259315 A1* | 11/2005 | Debut | H04B 10/2916 359/334 |
| 2008/0304137 A1 | 12/2008 | Kakui et al. | |
| 2011/0058250 A1 | 3/2011 | Liu et al. | |
| 2011/0286474 A1* | 11/2011 | Takenaga | H01S 3/06741 372/6 |
| 2014/0036938 A1* | 2/2014 | Nakai | H01S 5/0064 372/6 |
| 2014/0204387 A1* | 7/2014 | Narayanan | H01S 3/10023 356/461 |
| 2014/0240702 A1* | 8/2014 | Xu | G01N 21/65 359/385 |
| 2016/0178439 A1* | 6/2016 | Freudiger | G01J 3/44 356/301 |
| 2016/0226210 A1* | 8/2016 | Zayhowski | H01S 3/0085 |
| 2018/0073900 A1* | 3/2018 | Bastianini | H01S 3/06791 |

FOREIGN PATENT DOCUMENTS

| | | |
|---|---|---|
| CN | 103124044 A | 5/2013 |
| CN | 103151682 A | 6/2013 |
| JP | 2003-332653 A | 11/2003 |
| JP | 2004-079876 A | 3/2004 |
| JP | 2007-123477 A | 5/2007 |
| JP | 2009-016804 A | 1/2009 |
| JP | 2010-199563 A | 9/2010 |
| JP | 2012-518806 A | 8/2012 |
| JP | 2015-505064 A | 2/2015 |
| JP | 2015-095641 A | 5/2015 |
| WO | 2010/073645 A1 | 7/2010 |

OTHER PUBLICATIONS

International Search Report issued in corresponding International Application No. PCT/JP2019/002027 dated Apr. 2, 2019 (2 pages).

\* cited by examiner

FILTER ELEMENT, LASER DEVICE, FIBER LASER DEVICE, FILTER METHOD, AND METHOD FOR MANUFACTURING LASER DEVICE

TECHNICAL FIELD

The present invention relates to a filter element and a filtering method. The present invention also relates to a laser apparatus including a filter element and a method of producing the laser apparatus.

BACKGROUND

In the field of material processing, fiber laser apparatuses have been widely used in recent years. A fiber laser apparatus is a laser apparatus whose laser medium is an optical fiber having a core doped with rare earth (hereinafter may be referred to as "amplifying optical fiber"). Known examples of the fiber laser apparatus include resonator-type fiber laser apparatuses and MOPA-type fiber laser apparatuses.

As a fiber laser apparatus increases in power, nonlinear optical effect becomes significant. For example, it is known that scattered light generated by stimulated Raman scattering (stimulated Raman scattering is a kind of nonlinear optical effect) is a cause of making oscillation of laser light unstable and causing troubles to a pump light source that supplies pump light to an amplifying optical fiber.

A technique to address such an issue is disclosed in, for example, Patent Literature 1. Patent Literature 1 discloses a fiber laser apparatus that detects power of scattered light generated by stimulated Raman scattering and controls an excitation light source in accordance with the detected power.

PATENT LITERATURE

[Patent Literature 1]
Japanese Patent Application Publication, Tokukai, No. 2015-95641

The inventors of one or more embodiments of the present invention have found that light outputted from a fiber laser apparatus including a multi-mode fiber contains Stokes light and anti-Stokes light resulting from four-wave mixing in which a plurality of guide modes are involved.

The Stokes light and anti-Stokes light resulting from four-wave mixing, when they are large in power, are causes of, similarly to the scattered light generated by stimulated Raman scattering, making oscillation of laser light unstable and causing troubles to a pump light source that supplies pump light to an amplifying optical fiber.

The above issue may arise not only in fiber laser apparatuses but also in general laser apparatuses including a multi-mode fiber that guides laser light. One or more embodiments of the present invention provide a filter element, a laser apparatus, a filtering method, or a method of producing a laser apparatus each of which is capable of causing a loss of at least one of Stokes light and anti-Stokes light resulting from, in a multi-mode fiber, four-wave mixing in which a plurality of guide modes are involved.

SUMMARY

A filter element in accordance with one or more embodiments of the present invention is configured to cause a loss of light, belonging to a wavelength range that includes a peak wavelength of at least one of Stokes light and anti-Stokes light, in preference to light belonging to another wavelength range, the Stokes light and anti-Stokes light resulting from, in a multi-mode fiber configured to guide laser light, four-wave mixing in which a plurality of guide modes are involved.

A laser apparatus in accordance with one or more embodiments of the present invention includes the filter element and the multi-mode fiber.

A filtering method in accordance with one or more embodiments of the present invention includes a filtering step including causing a loss of light, belonging to a wavelength range that includes a peak wavelength of at least one of Stokes light and anti-Stokes light, in preference to light belonging to another wavelength range, the Stokes light and anti-Stokes light resulting from, in a multi-mode fiber configured to guide laser light, four-wave mixing in which a plurality of guide modes are involved.

A method of producing a laser apparatus in accordance with one or more embodiments of the present invention is a method of producing a laser apparatus including (i) a multi-mode fiber configured to guide laser light and (ii) a filter element configured to cause a loss of light belonging to a specific wavelength range in preference to light belonging to another wavelength range, the method including: a) determining a peak wavelength of at least one of Stokes light and anti-Stokes light resulting from, in the multi-mode fiber, four-wave mixing in which a plurality of guide modes are involved; and b) setting the specific wavelength range, in which the filter element preferentially causes a loss of light, such that the specific wavelength range includes the peak wavelength determined in step a).

According to one or more embodiments of the present invention, it is possible to provide a filter element, a laser apparatus, a filtering method, or a method of producing a laser apparatus each of which is capable of causing a loss of at least one of Stokes light and anti-Stokes light resulting from, in a multi-mode fiber, four-wave mixing in which a plurality of guide modes are involved.

DETAILED DESCRIPTION

The inventors of one or more embodiments of the present invention have found that light outputted from a fiber laser apparatus including a multi-mode fiber contains Stokes light and anti-Stokes light resulting from four-wave mixing in which a plurality of guide modes are involved.

Figure 10:
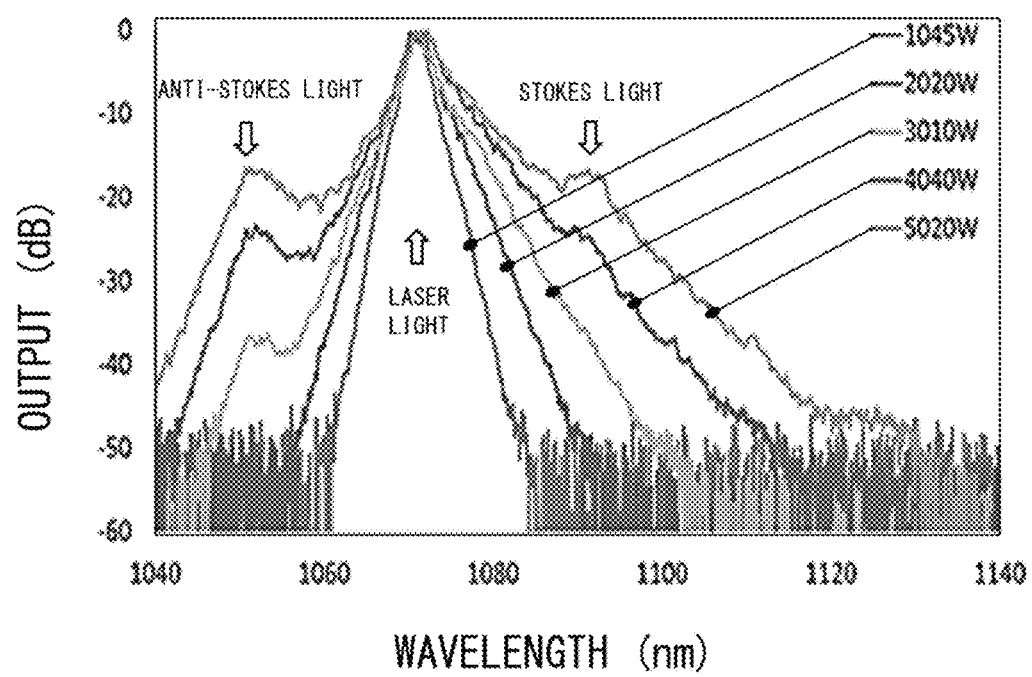
FIG. 10 is a chart showing spectra of light outputted from a fiber laser apparatus that includes a multi-mode fiber.

FIG. 10 is a chart showing spectra of light outputted from a fiber laser apparatus. The spectra of the light shown in the chart of FIG. 10 correspond to cases where the power of the laser light is 1045 W, 2020 W, 3010 W, 4040 W, and 5020 W, and are normalized to peak power. In the chart of FIG. 10, the peak that appears at 1070 nm corresponds to laser light oscillated by the fiber laser apparatus. The chart of FIG. 10 confirms that light having a peak wavelength longer than that of the laser light and light having a peak wavelength shorter than that of the laser light are present in addition to the laser light. The chart of FIG. 10 also confirms that the power of each of these two kinds of light increases exponentially relative to the power of the laser light.

The inventors conducted a study and found that these two kinds of light are Stokes light and anti-Stokes light which result from, in a multi-mode fiber, four-wave mixing in which a plurality of guide modes are involved. More specifically, the inventors found that these two kinds of light are Stokes light and anti-Stokes light which result from four-wave mixing in which LP01 mode and LP11 mode are involved. Note that, in a case where four-wave mixing in which LP01 mode and some other higher order mode other than LP11 mode are involved or four-wave mixing in which two higher order modes are involved occurs in the multi-mode fiber, Stokes light and anti-Stokes light resulting from such four-wave mixing can be contained in the light outputted from the laser apparatus.

Note that the spectra of the light shown in FIG. 10 are obtained by a fiber laser apparatus that has a means to reduce scattered light generated by stimulated Raman scattering. In a case of a fiber laser apparatus that does not have such a means, it may be difficult to confirm the presence of Stokes light resulting from four-wave mixing. This is because, according to a fiber laser apparatus that does not have such a means, the peak of the Stokes light resulting from four-wave mixing may be masked by the peak of the scattered light generated by stimulated Raman scattering. The inventors employed a technique to reduce the scattered light generated by stimulated Raman scattering in a fiber laser apparatus including a multi-mode fiber, and thereby for the first time succeeded in confirming the presence of Stokes light and anti-Stokes light resulting from four-wave mixing.

The following description will discuss one or more embodiments of a filter element that is capable of causing a loss of Stokes light and anti-Stokes light resulting from, in a multi-mode fiber, four-wave mixing in which a plurality of guide modes are involved, and a laser apparatus including such a filter element.

(Configuration of Laser Apparatus)

Figure 1:
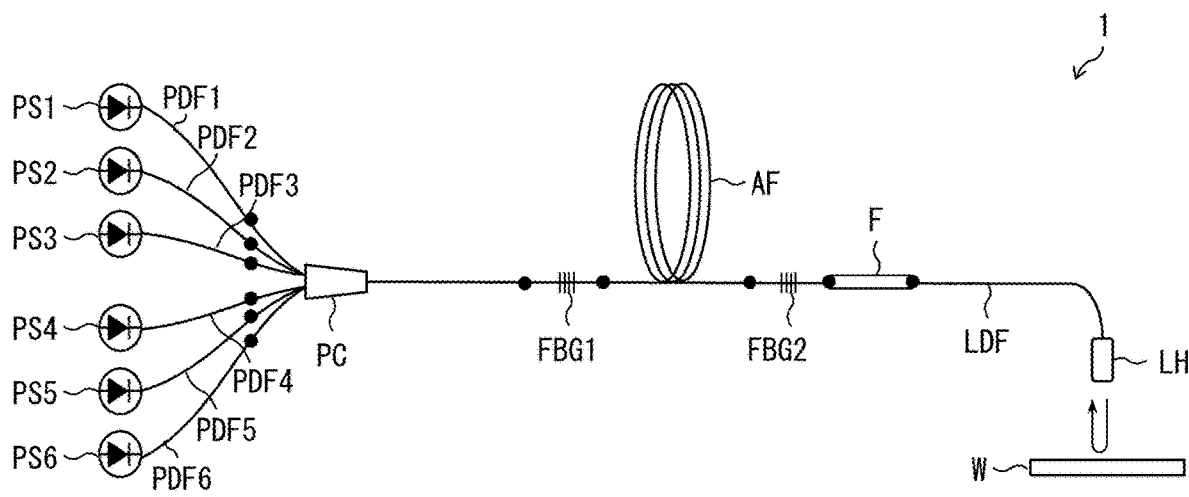
FIG. 1 is a block diagram illustrating a configuration of a laser apparatus in accordance with one or more embodiments of the present invention.

The following description will discuss a laser apparatus 1 in accordance with one or more embodiments of the present invention, with reference to FIG. 1. FIG. 1 is a block diagram illustrating a configuration of the laser apparatus 1.

The laser apparatus 1 is a fiber laser apparatus for machining, and causes oscillation of single wavelength laser light. As illustrated in FIG. 1, the laser apparatus 1 includes m pump light sources PS1 to PSm, m pump delivery fibers PDF1 to PDFm, a pump combiner PC, an amplifying optical fiber AF, two fiber Bragg gratings FBG1 and FBG2, a laser delivery fiber LDF, a laser head LH, and a filter device F. The pump light sources PS1 to PSm and the pump delivery fibers PDF1 to PDFm are in one-to-one correspondence with each other. Note here that m is a natural number of 2 or more, and represents the number of pump light sources PS1 to PSm and the number of the pump delivery fibers PDF1 to PDFm. FIG. 1 shows an example of a configuration of the laser apparatus 1 in a case where m=6. In this section, configurations of members other than the filter device F are discussed.

Each of the pump light sources PSj (j is a natural number of 1 or more and m or less) emits pump light. The pump light can be, for example, laser light having a peak wavelength of 975±3 nm or 915±3 nm. In one or more embodiments, the pump light sources PS1 to PSm are laser diodes. Each of the pump light sources PSj is connected to an input end of a corresponding pump delivery fiber PDFj. The pump light emitted by the pump light sources PSj is introduced into respective corresponding pump delivery fibers PDFi.

The pump delivery fibers PDFj guide the pump light emitted by the corresponding pump light sources PSj. Output ends of the pump delivery fibers PDFj are connected to an input port of the pump combiner PC. The pump light guided through the pump delivery fibers PDFj is introduced into the pump combiner PC via the input port.

The pump combiner PC combines pump light guided through the pump delivery fibers PDF1 to PDFm. An output port of the pump combiner PC is connected to an input end of the amplifying optical fiber AF via the first fiber Bragg grating FBG1. A portion, which has passed through the first fiber Bragg grating FBG1, of the pump light combined at the pump combiner PC is introduced into the amplifying optical fiber AF.

The amplifying optical fiber AF uses the pump light that has passed through the first fiber Bragg grating FBG1 to thereby amplify laser light belonging to a specific wavelength range (hereinafter referred to as "amplification bandwidth"). In one or more embodiments, the amplifying optical fiber AF is a double-clad fiber having a core doped with a rare-earth element (such as ytterbium, thulium, cerium, neodymium, europium, erbium, and/or the like). In this case, the pump light that has passed through the first fiber Bragg grating FBG1 is used to keep the rare-earth element in population inversion state. For example, in a case where the rare-earth element contained in the core is ytterbium, the amplification bandwidth of the amplifying optical fiber AF is, for example, the wavelength range of from 1000 nm to 1100 nm inclusive. In this case, the wavelength of laser light oscillated by the laser apparatus 1 is 1000 nm or longer and 1100 nm or less. An output end of the amplifying optical fiber AF is connected to an input end of the laser delivery fiber LDF1 via the second fiber Bragg grating FBG2.

The fiber Bragg gratings FBG1 and FBG2 reflect laser light belonging to a specific wavelength range (hereinafter referred to as "reflection bandwidth") that is included in the amplification bandwidth of the amplifying optical fiber AF. The first fiber Bragg grating FBG1 is higher in reflectivity in the reflection bandwidth than the second fiber Bragg grating FBG2, and serves as a mirror. The first fiber Bragg grating FBG1 can be, for example, a fiber Bragg grating that (i) has a reflection bandwidth whose central wavelength is 1070±3 nm and whose full width at half maximum is 3.5±0.5 nm and (ii) has a reflectivity of 99% or more in that reflection bandwidth. On the contrary, the second fiber Bragg grating FBG2 is lower in reflectivity in the reflection bandwidth than the first fiber Bragg grating FBG1, and serves as a half mirror. The second fiber Bragg grating FBG2 can be, for example, a fiber Bragg grating that (i) has a reflection bandwidth whose central wavelength is 1070±3 nm and whose full width at half maximum is 3.5±0.5 nm and (ii) has a reflectivity of 60% in that reflection bandwidth. Therefore, laser light belonging to the reflection bandwidth of the fiber Bragg gratings FBG1 and FBG2 is reflected repeatedly between the fiber Bragg gratings FBG1 and FBG2 and recursively amplified in the amplifying optical fiber AF. As such, the amplifying optical fiber AF and the fiber Bragg gratings FBG1 and FBG2 together form an oscillator that causes oscillation of laser light belonging to the reflection bandwidth of the fiber Bragg gratings FBG1 and FBG2. A portion, which has passed through the second fiber Bragg grating FBG2, of the laser light recursively amplified in the amplifying optical fiber AF is introduced into the laser delivery fiber LDF. Note that the central wavelength of the reflection bandwidth of the fiber Bragg gratings FBG1 and FBG2 can be, instead of 1070±3 nm, for example, 1030 nm, 1040 nm, 1050 nm, 1060 nm, 1070 nm, 1080 mm, 1087±6 nm, or 1090 nm. Accordingly, the oscillation wavelength of the laser apparatus 1 can be, instead of 1070±3 nm, for example, 1030 nm, 1040 nm, 1050 nm, 1060 nm, 1070 nm, 1080 mm, 1087±6 nm, or 1090 nm.

The laser delivery fiber LDF guides the laser light that has passed through the second fiber Bragg grating FBG2. An output end of the laser delivery fiber LDF is connected to the laser head LH. The laser light that has been guided through the laser delivery fiber LDF is applied to a workpiece W via the laser head LH.

(Four-Wave Mixing in Multi-Mode Fiber)

The amplifying optical fiber AF, the fiber Bragg gratings FBG1 and FBG2, and the laser delivery fiber LDF, which are included in the laser apparatus 1, can each be realized by a multi-mode fiber. In one or more embodiments, the laser delivery fiber LDF is a multi-mode fiber. Therefore, according to the laser apparatus 1, Stokes light can be amplified and anti-Stokes light can be generated in the laser delivery fiber LDF by four-wave mixing in which a plurality of guide modes are involved. Note that, in a case where the amplifying optical fiber AF is realized by a multi-mode fiber, four-wave mixing in which a plurality of guide modes are involved can also occur in the amplifying optical fiber AF.

As used herein, the term "four-wave mixing in which a plurality of guide modes are involved" refers to a phenomenon in which the fundamental mode component and a higher order mode component of laser light guided through a multi-mode fiber are involved as pump light or a first higher order mode component and a second higher order mode component of laser light guided through a multi-mode fiber are involved as pump light, and in which Stokes light and anti-Stokes light satisfying both frequency matching condition and phase matching condition are amplified or generated. The fundamental mode here is, for example, LP01 mode. Examples of a higher order mode include LP11 mode, LP21 mode, LP02 mode, LP31 mode, and LP12 mode.

For example, in a case where Stokes light of LP11 mode is amplified and anti-Stokes light of LP01 mode is generated by four-wave mixing in which the LP01 mode component and the LP11 mode component of laser light guided through a multi-mode fiber are involved as pump light, the frequency matching condition and the phase matching condition can be expressed as below.

Frequency matching condition: $\omega_s + \omega_{as} = 2\omega_p$ (1)

Phase matching condition: $\beta'(\omega_s) + \beta(\omega_{as}) = \beta(\omega_p) + \beta'(\Omega_p) - \gamma(P+P')$ (2b)

Alternatively, in a case where Stokes light of LP01 mode and anti-Stokes light of LP11 mode are generated by four-wave mixing in which the LP01 mode component and the LP11 mode component of laser light guided through a multi-mode fiber are involved as pump light, the frequency matching condition and the phase matching condition can be expressed as below.

Frequency matching condition: $\omega_s + \omega_{as} = 2\omega_p$ (1)

Phase matching condition: $\beta(\omega_s) + \beta'(\omega_{as}) = \beta(\omega_p) + \beta'(\Omega_p) - \gamma(P+P')$ (2a)

In the above equations, $\omega_p$ represents a peak angular frequency of laser light, $\omega_s$ represents a peak angular frequency of Stokes light, and $\omega_{as}$ represents a peak angular frequency of anti-Stokes light. Furthermore, $\beta(\omega)$ represents a propagation constant of the multi-mode fiber with regard to LP01 mode having an angular frequency $\omega$, and $\beta'(\omega)$ represents a propagation constant of the multi-mode fiber with regard to LP11 mode having an angular frequency $\omega$. Furthermore, P represents power of the LP01 mode component of the laser light, and P' represents power of the LP11 mode component of the laser light. Furthermore, $\gamma$ represents a non-linear coefficient.

Note here that the "propagation constant $\beta(\omega)$ of the multi-mode fiber with regard to LP01 mode" is given by a known polynomial expression containing the angular frequency $\omega$ as a variable. The polynomial expression contains a chromatic dispersion of the multi-mode fiber as a coefficient. Similarly, the "propagation constant $\beta'(\omega)$ of the multi-mode fiber with regard to LP11 mode" is given by a known polynomial expression containing the angular frequency $\omega$ as a variable. The polynomial expression contains a chromatic dispersion of the multi-mode fiber as a coefficient. That is, changing the chromatic dispersion of a multi-mode fiber will change the functional forms of the propagation constants $\beta(\omega)$ and $\beta'(\omega)$. Then, the change of the functional forms of the propagation constants $\beta(\omega)$ and $\beta'(\omega)$ will result in changes of peak angular frequencies $\omega_s$ and $\omega_{as}$ that satisfy both the frequency matching condition and the phase matching condition, i.e., changes of the peak angular frequencies $\omega_s$ and $\omega_{as}$ of Stokes light and anti-Stokes light. Furthermore, the changes of the peak angular frequencies $\omega_s$ and $\omega_{as}$ of the Stokes light and the anti-Stokes light will result in changes of peak wavelengths of the Stokes light and the anti-Stokes light. As such, the peak wavelengths of Stokes light and anti-Stokes light resulting from four-wave mixing in a multi-mode fiber depend on the chromatic dispersion of that multi-mode fiber. Note that the chromatic dispersion of a multi-mode fiber can be found by a known method such as measuring a refractive index distribution of the multi-mode fiber.

Note that, although the above description discussed four-wave mixing in which LP01 mode and LP11 mode are involved, the guide modes involved in four-wave mixing in the multi-mode fiber are not limited to LP01 mode and LP11 mode. Specifically, four-wave mixing in which any two guide modes selected from the modes guided through the multi-mode fiber can occur. For example, four-wave mixing in which a first higher order mode and a second higher order mode are involved, such as four-wave mixing in which LP11 mode and LP21 mode are involved, can occur. The frequency matching condition and the phase matching condition for such cases are given in the same manner as that for the four-wave mixing between LP01 mode and LP11 mode.

The inventors of one or more embodiments of the present invention calculated a propagation constant difference $\Delta\beta$ defined by the following equation, with regard to a combination of LP01 mode and an LPmn mode (LP01 mode, LP11 mode, LP21 mode, LP02 mode, LP31 mode). In the following equation (3), $\beta_{mn}$ represents a propagation constant of the LPmn mode, and f0 represents a frequency of laser light serving as pump light in four-wave mixing. The expression "f=f0+$\Delta$f" following "$\beta_{mn}$" means that the "$\beta_{mn}$" represents a propagation constant resulting when frequency f=f0+$\Delta$f, the expression "f=f0−$\Delta$f" following "$\beta_{mn}$" means that the "$\beta_{mn}$" represents a propagation constant resulting when frequency f=f0−$\Delta$f, and the expression "f=f0" following "$\beta_{mn}$" means that "$\beta_{mn}$" represents a propagation constant resulting when frequency f=f0.

$$\Delta\beta = \beta_{mn}|_{f=f0-\Delta f} + \beta_{01}|_{f=f0+\Delta f} - \beta_{01}|_{f=f0} - \beta_{mn}|_{f=f0} \qquad (3)$$

In a case where there is a value of $\Delta$f for which the propagation constant difference $\Delta\beta$ defined by the above equation (3) is zero, four-wave mixing occurs in which Stokes light of LPmn mode having a frequency f of f0−($\Delta$f+$\Delta\mu$) is amplified and anti-Stokes light of LP01 mode having a frequency f of f0+($\Delta$f+$\Delta\mu$) is generated. Note here that the above "$\Delta\mu$" represents the value indicative of the amount by which frequency shifts depending on the power of laser light. The "$\Delta$f" that appears in the above equation (3) is called "frequency shift".

Figure 11A:
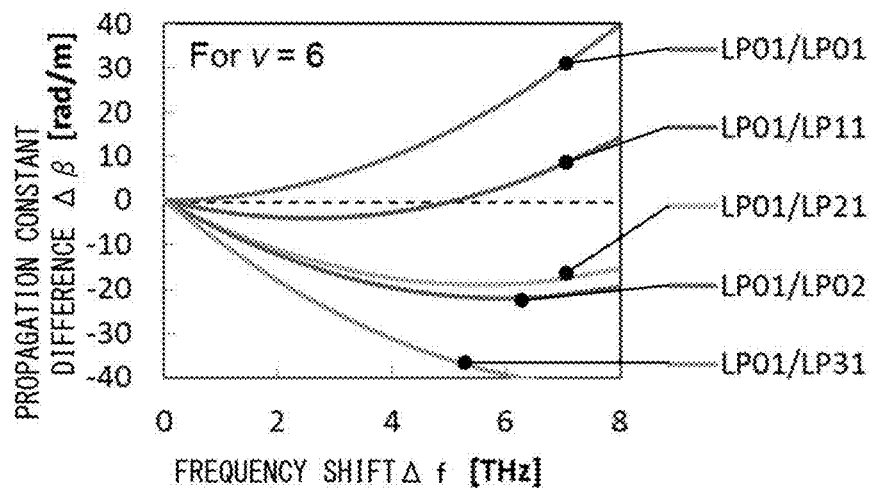
FIG. 11A is a chart showing the frequency dependence of a propagation constant difference with regard to a multi-mode fiber having a v-parameter of 6.
Figure 11B:
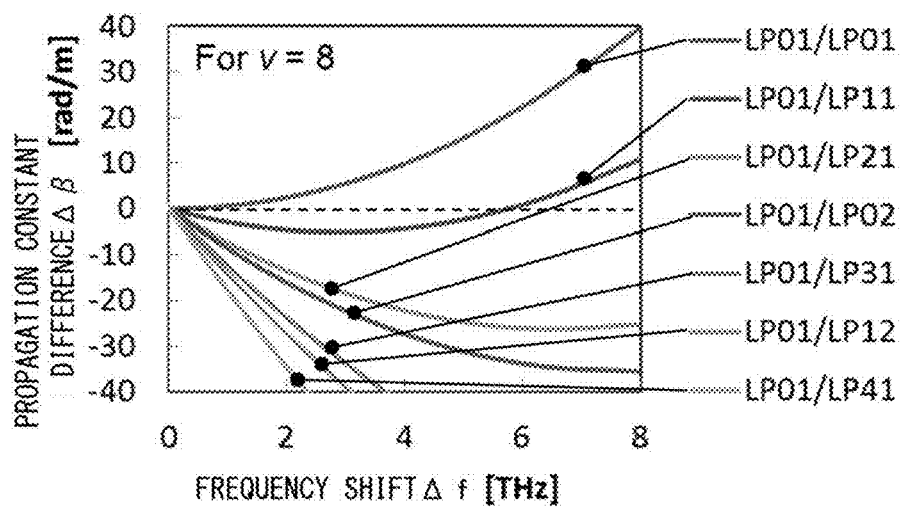
FIG. 11B is a chart showing the frequency dependence of a propagation constant difference with regard to a multi-mode fiber having a v-parameter of 8.
Figure 11C:
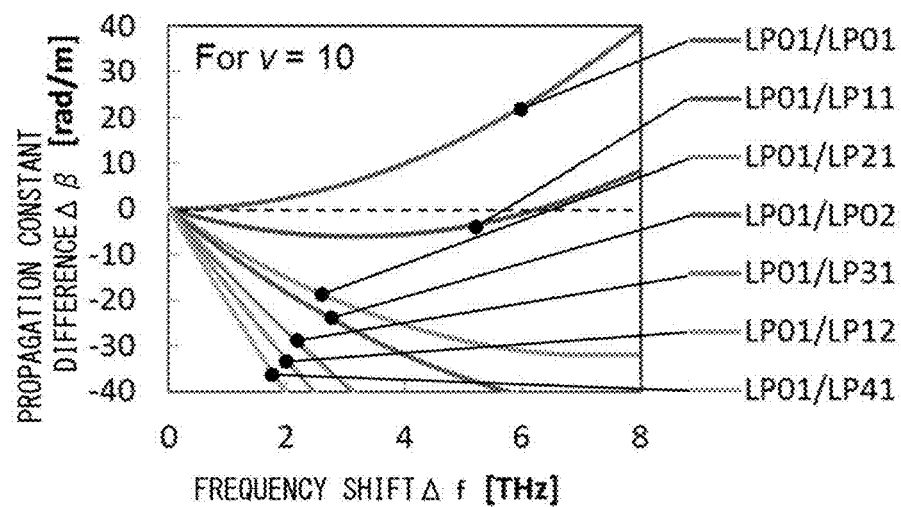
FIG. 11C is a chart showing the frequency dependence of a propagation constant difference with regard to a multi-mode fiber having a v-parameter of 10.

FIG. 11A is a chart showing the frequency shift $\Delta$f-dependence of the propagation constant difference $\Delta\beta$ calculated by the inventors with regard to a multi-mode fiber having a v-parameter of 6. FIG. 11B is a chart showing the frequency shift $\Delta$f-dependence of the propagation constant difference $\Delta\beta$ calculated by the inventors with regard to a multi-mode fiber having a v-parameter of 8. FIG. 11C is a chart showing the frequency shift $\Delta$f-dependence of the propagation constant difference $\Delta\beta$ calculated by the inventors with regard to a multi-mode fiber having a v-parameter of 10. As used herein, the "v-parameter" is quantity defined by the following equation (4), where a is a core diameter, no is the refractive index of the core, $n_1$ is the refractive index of a cladding, and $\lambda_0$ is the peak wavelength of laser light.

$$v = 2\pi a(n_1^2 - n_0^2)^{1/2}/\lambda_0 \qquad (4)$$

FIG. 11A-11C confirm that, in multi-mode fibers having a v-parameter of 6, 8, or 10, four-wave mixing in which Stokes light of LP11 mode is amplified and anti-Stokes light of LP01 mode is generated occurs. In this case, the frequency shift $\Delta$f is about 5 to 6 THz (equivalent to wavelength of about 15 to 20 nm). FIG. 11A-11C also suggests that, in multi-mode fibers having a v-parameter of 6, 8, or 10, four-wave mixing in which Stokes light of a higher order guide mode (e.g., LP21 mode, LP02 mode, LP31 mode) is amplified and anti-Stokes light of LP01 mode is generated can also occur. In this case, the frequency shift $\Delta$f is greater than 8 THz.

In the laser apparatus 1, laser light guided through the laser delivery fiber LDF, which is a multi-mode fiber, contains (a) laser light that is amplified by the amplifying optical fiber AF and then is guided through the laser delivery fiber LDF in a forward direction (the same direction as a direction in which the laser light goes out) and (b) laser light that is reflected at the workpiece W and then is guided through the laser delivery fiber LDF in a backward direction (opposite direction to the direction in which the laser light goes out). Stokes light and anti-Stokes light, resulting from four-wave mixing in which two guide modes contained in the laser light guided through the laser delivery fiber LDF in the forward direction are involved as pump light, are (1) guided through the laser delivery fiber LDF in the forward direction, (2) reflected at the workpiece W, and (3) guided through the laser delivery fiber LDF in the backward direction. Then, in a case where there is no filter device F, the Stokes light and anti-Stokes light enter the amplifying optical fiber AF via the second fiber Bragg grating FBG2. On the contrary, Stokes light and anti-Stokes light, resulting from four-wave mixing in which two guide modes contained in the laser light guided through the laser delivery fiber LDF in the backward direction are involved as pump light, are guided through the laser delivery fiber LDF in the backward direction. Then, in a case where there is no filter device F, the Stokes light and anti-Stokes light enter the amplifying optical fiber AF via the second fiber Bragg grating FBG2.

The Stokes light and the anti-Stokes light, after entering the amplifying optical fiber AF via the second fiber Bragg grating FBG2, may be amplified as they are guided through the amplifying optical fiber AF and may increase in power, in a case where the peak wavelength thereof or a wavelength near the peak wavelength is included in the amplification bandwidth of the amplifying optical fiber AF. Such high-power Stokes light and anti-Stokes light guided through the amplifying optical fiber AF may make the oscillation of laser light unstable. Furthermore, if such high-power Stokes light and anti-Stokes light are outputted from the amplifying optical fiber AF via the first fiber Bragg grating and enter the pump light sources PS1 to PSm, the pump light sources PS1 to PSm may undergo some trouble. In view of this, the laser apparatus 1 in accordance with one or more embodiments employs the following arrangement: a filter device F for causing a loss of at least one of the Stokes light and anti-Stokes light is provided to the laser delivery fiber LDF, thereby reducing the power of at least one of the Stokes light and anti-Stokes light that enter the amplifying optical fiber AF via the second fiber Bragg grating FBG2.

As used herein, the term "multi-mode fiber" refers to an optical fiber with two or more guide modes. The number of guide modes of a multi-mode fiber depends on the design of the multi-mode fiber, and is, for example, ten. A "few-mode fiber", which is a fiber with two or more and ten or less guide modes, is an example of a multi-mode fiber. Furthermore, as used herein, the term "Stokes light" refers to Stokes light that is generated in a multi-mode fiber by four-wave mixing in which a plurality of guide modes are involved, unless otherwise specified, and the term "anti-Stokes light" refers to anti-Stokes light that is generated in a multi-mode fiber by four-wave mixing in which a plurality of guide modes are involved, unless otherwise specified.

(Function of Filter)

The laser apparatus 1 in accordance with one or more embodiments includes the filter device F at the laser delivery fiber LDF. The filter device F (or a filter element included in the filter device F) is configured to cause a loss of light, belonging to a wavelength range that includes the peak wavelength of at least one of Stokes light and anti-Stokes light (which result from, in the laser delivery fiber LDF, four-wave mixing in which a plurality of guide modes are involved), in preference to light belonging to another wavelength range. Thus, according to the laser apparatus 1, the filter device F included in the laser apparatus 1, or the filter element included in the filter device F, it is possible to reduce the power of at least one of Stokes light and anti-Stokes light. Note that the Stokes light and anti-Stokes light which are to be subjected to loss may be (1) Stokes light and anti-Stokes light resulting from four-wave mixing in which a fundamental mode component and a higher order mode component of laser light guided through a multi-mode fiber are involved as pump light or (2) Stokes light and anti-Stokes light resulting from four-wave mixing in which a first higher order mode component and a second higher order mode component of laser light guided through a multi-mode fiber are involved as pump light.

Figure 2:
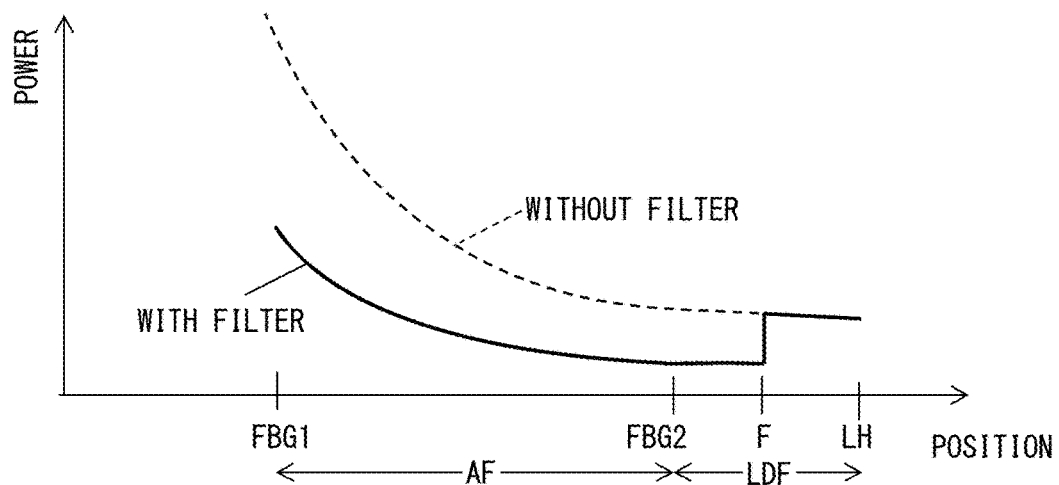
FIG. 2 is a chart showing the power of Stokes light that propagates through a laser delivery fiber and an amplifying optical fiber in a backward direction in the laser apparatus illustrated in FIG. 1.

The following description will specifically discuss, with reference to FIG. 2, an effect provided by the filter device F which is configured to cause a loss of light belonging to a wavelength range including the peak wavelength of anti-Stokes light in preference to light belonging to another wavelength range. FIG. 2 is a chart showing the power of anti-Stokes light that propagates through the laser delivery fiber LDF and the amplifying optical fiber AF in the backward direction. Note that the power of Stokes light also shows similar tendencies to those shown in FIG. 2.

If the filter device F is absent, the anti-Stokes light, after propagating through the laser delivery fiber LDF in the backward direction, enters the amplifying optical fiber AF with its power maintained, and propagates through the amplifying optical fiber AF in the backward direction while increasing in power. Therefore, the power of anti-Stokes light that propagates through the amplifying optical fiber AF in the backward direction, and the power of anti-Stokes light that goes out of the amplifying optical fiber AF via the first fiber Bragg grating FBG1, are greater than when the filter device F is present. On the contrary, in a case where the filter device F is present, anti-Stokes light after propagating through the laser delivery fiber LDF in the backward direction is reduced in its power by the filter device F before entering the amplifying optical fiber AF, and propagates through the amplifying optical fiber AF in the backward direction while increasing in power. Therefore, the power of anti-Stokes light that propagates through the amplifying optical fiber AF in the backward direction, and the power of anti-Stokes light that goes out of the amplifying optical fiber AF via the first fiber Bragg grating FBG1, are less than when the filter device F is absent. As such, the presence of the filter device F makes it possible to reduce the likelihood that the anti-Stokes light will make the oscillation of laser light unstable or the likelihood that the anti-Stokes light will reduce the reliability of pump light sources pump light sources PS1 to PSm. More specifically, it is possible to reduce the amount of anti-Stokes light that enters the amplifying optical fiber AF. In a case where anti-Stokes light enters the amplifying optical fiber AF, such light may be amplified by the amplifying optical fiber AF. In such a case, the energy of pump light is consumed. The above arrangement makes it possible to reduce such energy consumption.

Furthermore, in a case where the filter device F is present, anti-Stokes light that is guided through the laser delivery fiber LDF in the forward direction is reduced in its power by the filter device F before applied to the workpiece W. Therefore, the power of anti-Stokes light applied to the workpiece W is less than when the filter device F is absent. As such, in the case where the filter device F is present, it is possible to reduce the amount of anti-Stokes light having different peak wavelength from that of laser light in outgoing light. This makes it possible to reduce the likelihood that working properties will decrease due to defocus resulting from chromatic aberration, the likelihood that the beam spot will not be easily focused at a desired position, and the likelihood that a component will accidentally generate heat or deteriorate when the component has different absorption characteristics for different wavelengths. Furthermore, since it is possible to cause a loss of the anti-Stokes light generated in the laser delivery fiber LDF in an early stage, it is also possible to reduce the likelihood of unstable oscillation of laser light in the amplifying optical fiber AF as described earlier or reduce a reduction in reliability of the pump light sources PS1 to PSm which supply pump light to the amplifying optical fiber AF.

The above description has discussed the effect provided by the filter device F configured to cause a loss of light belonging to a wavelength range including the peak wavelength of anti-Stokes light in preference to light belonging to another wavelength range; however, the configuration of the filter device F is not limited as such. Specifically, the filter device F may be configured to cause a loss of light belonging to a wavelength range including the peak wavelength of Stokes light in preference to light belonging to another wavelength range. This provides the same effects as those described earlier, with regard to Stokes light. Alternatively, the filter device F may be configured to preferentially cause a loss of both of (i) light belonging to a first wavelength range that includes the peak wavelength of Stokes light and (ii) light belonging to a second wavelength range that includes the peak wavelength of anti-Stokes light and that does not overlap the first wavelength range. This provides the foregoing effects with regard to anti-Stokes light and also provides, with regard to Stokes light, the same effects as those described earlier.

Note that, in a case where Stokes light is to be subjected to loss, the wavelength range in which the filter device F preferentially causes a loss of light is preferably, for example, a wavelength range in which (i) the lower limit is a wavelength longer by 10 nm than the peak wavelength of laser light and (ii) the upper limit is a wavelength longer by 40 nm than the peak wavelength of the laser light. In this case, when, for example, the peak wavelength of the laser light is 1070 nm, the wavelength range of from 1080 nm to 1110 nm inclusive or the wavelength range of from 1090 nm to 1100 nm inclusive is the wavelength range in which the filter device F preferentially causes a loss of light. On the contrary, in a case where anti-Stokes light is to be subjected to loss, the wavelength range in which the filter device F preferentially causes a loss of light is preferably, for example, a wavelength range in which (i) the lower limit is a wavelength shorter by 40 nm than the peak wavelength of laser light and (ii) the upper limit is a wavelength shorter by 10 nm than the peak wavelength of the laser light. In this case, when, for example, the peak wavelength of the laser light is 1070 nm, the wavelength range of from 1030 nm to 1060 nm inclusive or the wavelength range of from 1040 nm to 1050 nm inclusive is the wavelength range in which the filter device F preferentially causes a loss of light.

As described earlier, examples of the oscillation wavelength of the laser apparatus 1 (peak wavelength of laser light) include not only 1070 nm but also 1070±3 nm, 1030 nm, 1040 nm, 1050 nm, 1060 nm, 1080 mm, 1087±6 nm, and 1090 nm. Accordingly, in a case where Stokes light is to be subjected to loss, examples of the preferable wavelength range in which the filter device F preferentially causes a loss of light include not only the wavelength range of from 1080 nm to 1110 nm inclusive but also: the wavelength range of from 1080±3 nm to 1110±3 nm inclusive; the wavelength range of from 1040 nm to 1070 nm inclusive; the wavelength range of from 1050 nm to 1080 nm inclusive; the wavelength range of from 1060 nm to 1090 nm inclusive; the wavelength range of from 1070 nm to 1100 nm inclusive; the wavelength range of from 1090 nm to 1120 nm inclusive; the wavelength range of from 1097±6 nm to 1127±6 nm inclusive; and the wavelength range of from 1100 nm to 1130 nm inclusive. Specifically, in a case where the peak wavelength of laser light is 1070±3 nm, the wavelength range of from 1080±3 nm to 1110±3 nm inclusive or the wavelength range of from 1080±3 nm to 1100±3 nm inclusive is the wavelength range in which the filter device F preferentially causes a loss of light. Alternatively, in a case where the peak wavelength of laser light is 1030 nm, the wavelength range of from 1040 nm to 1070 nm inclusive or the wavelength range of from 1040 nm to 1060 nm inclusive is the wavelength range in which the filter device F preferentially causes a loss of light. Alternatively, in a case where the peak wavelength of laser light is 1040 nm, the wavelength range of from 1050 nm to 1080 nm inclusive or the wavelength range of from 1050 nm to 1070 nm inclusive is the wavelength range in which the filter device F preferentially causes a loss of light. Alternatively, in a case where the peak wavelength of laser light is 1050 nm, the wavelength range of from 1060 nm to 1090 nm inclusive or the wavelength range of from 1060 nm to 1080 nm inclusive is the wavelength range in which the filter device F preferentially causes a loss of light. Alternatively, in a case where the peak wavelength of laser light is 1060 nm, the wavelength range of from 1070 nm to 1100 nm inclusive or the wavelength range of from 1070 nm to 1090 nm inclusive is the wavelength range in which the filter device F preferentially causes a loss of light. Alternatively, in a case where the peak wavelength of laser light is 1080 nm, the wavelength range of from 1090 nm to 1120 nm inclusive or the wavelength range of from 1090 nm to 1110 nm inclusive is the wavelength range in which the filter device F preferentially causes a loss of light. Alternatively, in a case where the peak wavelength of laser light is 1087±6 nm, the wavelength range of from 1097±6 nm to 1127±6 nm inclusive or the wavelength range of from 1097±6 nm to 1117±6 nm inclusive is the wavelength range in which the filter device F preferentially causes a loss of light. Alternatively, in a case where the peak wavelength of laser light is 1090 nm, the wavelength range of from 1100 nm to 1130 nm inclusive or the wavelength range of from 1100 nm to 1120 nm inclusive is the wavelength range in which the filter device F preferentially causes a loss of light.

Alternatively, in a case where anti-Stokes light is to be subjected to loss, examples of the preferable wavelength range in which the filter device F preferentially causes a loss of light include not only the wavelength range of from 1030 nm to 1060 nm inclusive but also: the wavelength range of from 1030±3 nm to 1060±3 nm inclusive; the wavelength range of from 990 nm to 1020 nm inclusive; the wavelength range of from 1000 nm to 1030 nm inclusive; the wavelength range of from 1010 nm to 1040 nm inclusive; the wavelength range of from 1020 nm to 1050 nm inclusive; the wavelength range of from 1040 nm to 1070 nm inclusive; the wavelength range of from 1047±6 nm to 1077±6 nm inclusive; and the wavelength range of from 1050 nm to 1080 nm inclusive. Specifically, in a case where the peak wavelength of laser light is 1070±3 nm, the wavelength range of from 1030±3 nm to 1060±3 nm inclusive or the wavelength range of from 1040±3 nm to 1060±3 nm inclusive is the wavelength range in which the filter device F preferentially causes a loss of light. Alternatively, in a case where the peak wavelength of laser light is 1030 nm, the wavelength range of from 990 nm to 1020 nm inclusive or the wavelength range of from 1000 nm to 1020 nm inclusive is the wavelength range in which the filter device F preferentially causes a loss of light. Alternatively, in a case where the peak wavelength of laser light is 1040 nm, the wavelength range of from 1000 nm to 1030 nm inclusive or the wavelength range of from 1010 nm to 1030 nm inclusive is the wavelength range in which the filter device F preferentially causes a loss of light. Alternatively, in a case where the peak wavelength of laser light is 1050 nm, the wavelength range of from 1010 nm to 1040 nm inclusive or the wavelength range of from 1020 nm to 1040 nm inclusive is the wavelength range in which the filter device F preferentially causes a loss of light. Alternatively, in a case where the peak wavelength of laser light is 1060 nm, the wavelength range of from 1020 nm to 1050 nm inclusive or the wavelength range of from 1030 nm to 1050 nm inclusive is the wavelength range in which the filter device F preferentially causes a loss of light. Alternatively, in a case where the peak wavelength of laser light is 1080 nm, the wavelength range of from 1040 nm to 1070 nm inclusive or the wavelength range of from 1050 nm to 1070 nm inclusive is the wavelength range in which the filter device F preferentially causes a loss of light. Alternatively, in a case where the peak wavelength of laser light is 1087±6 nm, the wavelength range of from 1047±6 nm to 1077±6 nm inclusive or the wavelength range of from 1057±6 nm to 1077±6 nm inclusive is the wavelength range in which the filter device F preferentially causes a loss of light. Alternatively, in a case where the peak wavelength of laser light is 1090 nm, the wavelength range of from 1050 nm to 1080 nm inclusive or the wavelength range of from 1060 nm to 1080 nm inclusive is the wavelength range in which the filter device F preferentially causes a loss of light.

Note that it is preferable that the filter device F causes a loss of light belonging to a wavelength range that includes the peak wavelength of at least one of Stokes light and anti-Stokes light in preference to laser light oscillated by the laser apparatus 1 (this laser light may be hereinafter referred to as "laser light" for short). In other words, the foregoing "light belonging to another wavelength range" is preferably laser light. This makes it possible to reduce the power of at least one of the Stokes light and anti-Stokes light while reducing a reduction in power of laser light applied to the workpiece W. It is also preferable that the filter device F causes a loss of light belonging to a wavelength range that includes the peak wavelength of at least one of Stokes light and anti-Stokes light in preference to scattered light generated by stimulated Raman scattering of laser light. In other words, the foregoing "light belonging to another wavelength range" is preferably scattered light generated by stimulated Raman scattering of laser light. This makes it possible, in a case where the laser apparatus 1 includes a means to reduce the scattered light generated by stimulated Raman scattering, to reduce, with use of the filter device F, Stokes light and anti-Stokes whose power is difficult to reduce by such a means.

Note, here, that the peak wavelength of Stokes light is longer than the peak wavelength of laser light, whereas the peak wavelength of anti-Stokes light is shorter than the peak wavelength of laser light. Therefore, by employing an arrangement in which the filter device F is configured to preferentially cause a loss of light belonging to a wavelength range that includes the peak wavelength of Stokes light and that is longer in wavelength than the peak wavelength of laser light, it is possible to cause a loss of Stokes light while reducing a reduction in power of laser light. Alternatively, by employing an arrangement in which the filter device F is configured to preferentially cause a loss of light belonging to a wavelength range that includes the peak wavelength of anti-Stokes light and that is shorter in wavelength than the peak wavelength of laser light, it is possible to cause a loss of anti-Stokes light while reducing a reduction in power of laser light.

Note that the laser apparatus 1 may include a reducing section (not illustrated) that reduces scattered light generated by stimulated Raman scattering of laser light (scattered light generated by stimulated Raman scattering may be hereinafter referred to as "stimulated Raman scattered light"). Examples of a method of reducing stimulated Raman scattered light include: a method by which the generation of stimulated Raman scattered light is reduced; and a method by which a loss of generated stimulated Raman scattered light is caused. Specific examples of the method by which the generation of stimulated Raman scattered light is reduced include: a method by which effective area $A_{\textit{eff}}$ of the core is increased; and a method by which core $\Delta$ (i.e., relative refractive index difference between core and cladding) is reduced. In such cases, an optical fiber, in which the generation of stimulated Raman scattered light is reduced by any of such methods, serves as the foregoing reducing section. Examples of the method by which a loss of generated stimulated Raman scattered light is caused include: a method by which stimulated Raman scattered light is preferentially coupled to a cladding with use of a slanted fiber Bragg grating or photonic bandgap fiber; and a method by which stimulated Raman scattered light is reflected with use of a fiber Bragg grating. In such cases, a filter such as a slanted fiber Bragg grating, photonic bandgap fiber, or fiber Bragg grating used in realizing any of such methods serves as the foregoing reducing section. In a case where a slanted fiber Bragg grating or a photonic bandgap fiber is used as the reducing section, an arrangement in which the laser delivery fiber LDF includes the reducing section may be employed, for example.

Note that the peak wavelength of stimulated Raman scattered light is longer than the peak wavelength of laser light. Therefore, a loss of anti-Stokes light, which is shorter in peak wavelength than laser light, cannot be caused with use of a filter device or filter element which is configured to cause a loss of stimulated Raman scattered light. The filter device F in accordance with one or more embodiments is capable of further ensuring that a loss of anti-Stokes light is caused, and thus is effective also in a laser apparatus 1 that includes a filter device or filter element configured to cause a loss of stimulated Raman scattered light.

On the other hand, a loss of Stokes light, which is longer in peak wavelength than laser light, can be or cannot be caused with use of a filter device or filter element which is configured to cause a loss of stimulated Raman scattered light. A loss of Stokes light can be caused with use of a filter device or filter element which is configured to cause a loss of stimulated Raman scattered light in a case where the peak wavelength of Stokes light is equal to the peak wavelength of stimulated Raman scattered light. In a case where the peak wavelength of Stokes light is different from the peak wavelength of stimulated Raman scattered light, a filter device F configured to cause a loss of Stokes light is effective also in a laser apparatus 1 that includes a filter device or filter element configured to cause a loss of stimulated Raman scattered light. In particular, in a case where the relationship "peak wavelength of Stokes light<peak wavelength of stimulated Raman scattered light" holds, it is effective to employ an arrangement in which the filter device F is configured to preferentially cause a loss of light belonging to a wavelength range that includes the peak wavelength of Stokes light and that is longer in wavelength than the peak wavelength of laser light and is shorter in wavelength than the peak wavelength of stimulated Raman scattered light. In other words, it is effective to employ an arrangement in which the filter device F is configured to allow passage of at least laser light and stimulated Raman scattered light and have a loss range between the peak wavelength of laser light and the peak wavelength of stimulated Raman scattered light. The results of actual experiments demonstrate that Stokes light is generated in a wavelength range between the peak wavelength of laser light and the peak wavelength of stimulated Raman scattered light; therefore, as described above, by providing a loss range in a wavelength range between the peak wavelength of laser light and the peak wavelength of stimulated Raman scattered light, it is possible to reduce this Stokes light. On the contrary, in a case where the relationship "peak wavelength of Stokes light>peak wavelength of stimulated Raman scattered light" holds, it is effective to employ an arrangement in which the filter device F is configured to preferentially cause a loss of light belonging to a wavelength range that includes the peak wavelength of Stokes light and that is longer in wavelength than the peak wavelength of stimulated Raman scattered light. With this arrangement, the filter device F in accordance with one or more embodiments is capable of further ensuring that a loss of Stokes light is caused, and thus is effective also in a laser apparatus 1 that includes a filter device or filter element configured to cause a loss of stimulated Raman scattered light.

Note that, in the laser apparatus 1, spontaneous emission may occur in the amplifying optical fiber AF. To address this, the laser apparatus 1 may employ the following arrangement: the laser apparatus 1 includes a filter that causes a loss of light belonging to a wavelength range that includes the peak wavelength of spontaneous emission in preference to light belonging to another wavelength range and thereby removes the spontaneous emission. Note here that, in a case where the wavelength of spontaneous emission is different from the wavelength of anti-Stokes light, a filter configured to cause a loss of spontaneous emission is not enough to cause a loss of anti-Stokes light sufficiently. Therefore, in a case where the laser apparatus 1 has such an arrangement, a filter device F configured to cause a loss of anti-Stokes light is effective. Furthermore, in a case where the wavelength of spontaneous emission is different from the wavelength of Stokes light, a filter configured to cause a loss of spontaneous emission is not enough to cause a loss of Stokes light sufficiently. Therefore, in a case where the laser apparatus 1 has such an arrangement, a filter device F configured to cause a loss of Stokes light is effective.

Note that, according to the chart shown in FIG. 10, Stokes light and anti-Stokes light that affect the spectral shape of outgoing light are generated especially in a case where the power of laser light oscillated by the laser apparatus 1 is 3 kW or greater or in a case where the power of outgoing light (including Stokes light and anti-Stokes light) outputted from the laser apparatus 1 is 4 kW or greater. Therefore, especially in the case where the power of laser light oscillated by the laser apparatus 1 is 3 kW or greater or in the case where the power of outgoing light outputted from the laser apparatus 1 is 4 kW or greater, the filter device F functions especially effectively.

(First Example Configuration of Filter Device)

Figure 3A:
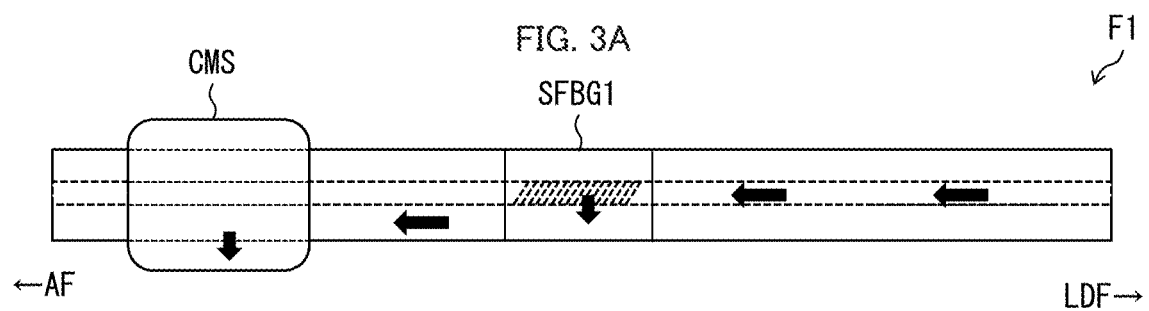
FIGS. 3A-3C show side views illustrating first example configurations of a filter included in the laser apparatus illustrated in FIG. 1.
Figure 3B:
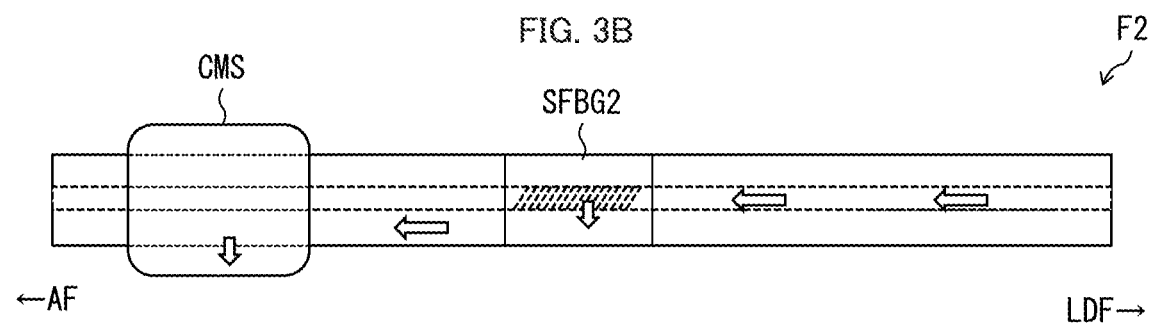
Figure 3C:
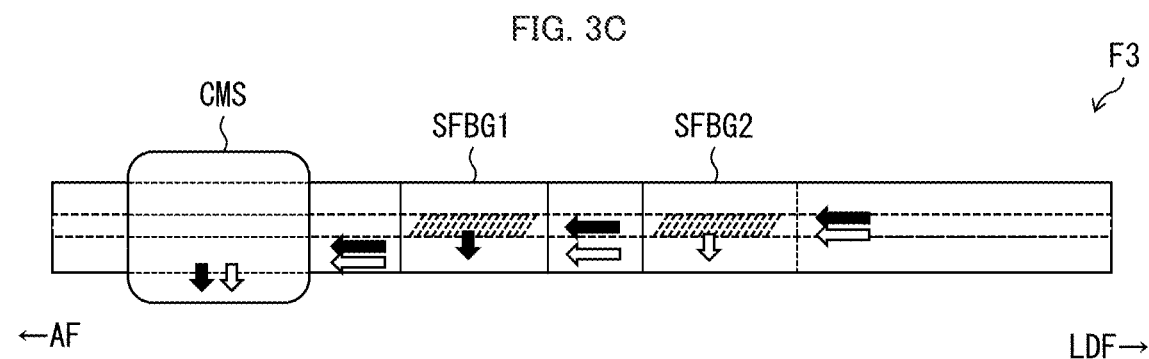

The following description will discuss, with reference to FIG. 3A-3C, first example configurations of the filter device F included in the laser apparatus 1 in accordance with one or more embodiments.

FIG. 3A is a side view illustrating an example configuration of a filter device F configured to cause a loss of light belonging to a wavelength range that includes the peak wavelength of anti-Stokes light in preference to light belonging to another wavelength range (this filter device is hereinafter referred to as "filter device F1").

The filter device F1 includes a slanted fiber Bragg grating SFBG1 (corresponding to an example of "filter element" recited in the claims) and a cladding mode stripper CMS. The cladding mode stripper CMS is located closer to the amplifying optical fiber AF than the slanted fiber Bragg grating SFBG1 is.

The slanted fiber Bragg grating SFBG1 is configured such that, for example, light belonging to the wavelength range of from 1030 nm to 1060 nm inclusive is coupled to a cladding in preference to light belonging to another wavelength range. Therefore, anti-Stokes light which has entered the filter device F1 from the laser delivery fiber LDF transitions to the cladding as it passes through the slanted fiber Bragg grating SFBG1. The cladding mode stripper CMS allows the light transitioned to the cladding to leak out. As such, anti-Stokes light transitioned to the cladding as it passed through the slanted fiber Bragg grating SFBG1 leaks out as it passes through the cladding mode stripper CMS.

As described above, use of the slanted fiber Bragg grating SFBG1 (which is a filter element) or use of the filter device F1 makes it possible to cause a loss of anti-Stokes light that has entered the filter device F1 from the laser delivery fiber LDF. Note that the loss of anti-Stokes light at the filter device F1 is, for example, about −10 dB.

Note, here, that the cladding mode stripper CMS is located closer to the amplifying optical fiber AF than the slanted fiber Bragg grating SFBG1 is, for anti-Stokes light having entered the filter device F1 from the laser delivery fiber LDF to leak out. Adding another cladding mode stripper at a position closer to the laser delivery fiber LDF than the slanted fiber Bragg grating SFBG1 is makes it possible to allow anti-Stokes light having entered the filter device F1 from the amplifying optical fiber AF to leak out by the following mechanism. Specifically, anti-Stokes light which has entered the filter device F1 from the amplifying optical fiber AF transitions to the cladding as it passes through the slanted fiber Bragg grating SFBG1. Here, the foregoing another cladding mode stripper allows this light transitioned to the cladding to leak out. As such, anti-Stokes light, which has transitioned to the cladding as it passed through the slanted fiber Bragg grating SFBG1, leaks out as it passes through the foregoing another cladding mode stripper.

FIG. 3B is a side view illustrating an example configuration of a filter device F configured to cause a loss of light belonging to a wavelength range that includes the peak wavelength of Stokes light in preference to light belonging to another wavelength range (this filter device is hereinafter referred to as "filter device F2").

The filter device F2 includes a slanted fiber Bragg grating SFBG2 (corresponding to an example of "filter element" recited in the claims) and a cladding mode stripper CMS. The cladding mode stripper CMS is located closer to the amplifying optical fiber AF than the slanted fiber Bragg grating SFBG2 is.

The slanted fiber Bragg grating SFBG2 is configured such that, for example, light belonging to the wavelength range of from 1080 nm to 1110 nm inclusive is coupled to a cladding in preference to light belonging to another wavelength range. Therefore, Stokes light which has entered the filter device F2 from the laser delivery fiber LDF transitions to the cladding as it passes through the slanted fiber Bragg grating SFBG2. The cladding mode stripper CMS allows the light transitioned to the cladding to leak out. As such, Stokes light transitioned to the cladding as it passed through the slanted fiber Bragg grating SFBG2 leaks out as it passes through the cladding mode stripper CMS.

As described above, use of the slanted fiber Bragg grating SFBG2 (which is a filter element) or use of the filter device F2 makes it possible to cause a loss of Stokes light that has entered the filter device F2 from the laser delivery fiber LDF. Note that the loss of Stokes light at the filter device F2 is, for example, about −10 dB.

Note, here, that the cladding mode stripper CMS is located closer to the amplifying optical fiber AF than the slanted fiber Bragg grating SFBG2 is, for Stokes light having entered the filter device F2 from the laser delivery fiber LDF to leak out. Adding another cladding mode stripper at a position closer to the laser delivery fiber LDF than the slanted fiber Bragg grating SFBG2 is makes it possible to allow Stokes light having entered the filter device F2 from the amplifying optical fiber AF to leak out by the following mechanism.

Specifically, Stokes light which has entered the filter device F2 from the amplifying optical fiber AF transitions to the cladding as it passes through the slanted fiber Bragg grating SFBG2. Note here that the foregoing another cladding mode stripper allows this light transitioned to the cladding to leak out. As such, Stokes light, which has transitioned to the cladding as it passed through the slanted fiber Bragg grating SFBG2, leaks out as it passes through the foregoing another cladding mode stripper.

FIG. 3C is a side view illustrating an example configuration of a filter device F configured to cause a loss of light belonging to a wavelength range that includes the peak wavelengths of both anti-Stokes light and Stokes light in preference to light belonging to another wavelength range (this filter device is hereinafter referred to as "filter device F3").

The filter device F3 includes the foregoing slanted fiber Bragg grating SFBG1 (corresponding to an example of "second filter element" recited in the claims), the foregoing slanted fiber Bragg grating SFBG2 (corresponding to an example of "first filter element" recited in the claims), and a cladding mode stripper CMS. The cladding mode stripper CMS is located closer to the amplifying optical fiber AF than the slanted fiber Bragg gratings SFBG1 and SFBG2 are.

The slanted fiber Bragg grating SFBG2 is configured such that, for example, light belonging to the wavelength range of from 1080 nm to 1110 nm inclusive is coupled to a cladding in preference to light belonging to another wavelength range. Therefore, Stokes light which has entered the filter device F3 from the laser delivery fiber LDF transitions to the cladding as it passes through the slanted fiber Bragg grating SFBG2. The slanted fiber Bragg grating SFBG1 is configured such that, for example, light belonging to the wavelength range of from 1030 nm to 1060 nm inclusive is coupled to the cladding in preference to light belonging to another wavelength range. Therefore, anti-Stokes light which has entered the filter device F3 from the laser delivery fiber LDF transitions to the cladding as it passes through the slanted fiber Bragg grating SFBG1. The cladding mode stripper CMS allows the light transitioned to the cladding to leak out. As such, (1) Stokes light transitioned to the cladding as it passed through the slanted fiber Bragg grating SFBG2 and (2) anti-Stokes light transitioned to the cladding as it passed through the slanted fiber Bragg grating SFBG1 leak out as they pass through the cladding mode stripper CMS.

As described above, use of the slanted fiber Bragg gratings SFBG1 and SFBG2 (which are filter elements) or use of the filter device F3 makes it possible to cause a loss of both Stokes light and anti-Stokes light that have entered the filter device F3 from the laser delivery fiber LDF. Note that the loss of Stokes light and the loss of anti-Stokes light at the filter device F3 are, for example, each about −10 dB.

Note that the relative positions of the slanted fiber Bragg gratings SFBG1 and FBG2 in the filter device F3 are preferably arranged as described below. Specifically, in a case where the power of Stokes light is greater than the power of anti-Stokes light, the slanted fiber Bragg grating SFBG2 (which is configured to cause a loss of Stokes light) is located closer to the workpiece W than the slanted fiber Bragg grating SFBG1 (which is configured to cause a loss of anti-Stokes light) is. That is, the slanted fiber Bragg grating SFBG2 is located downstream of the slanted fiber Bragg grating SFBG1. On the contrary, in a case where the power of anti-Stokes light is greater than the power of Stokes light, the slanted fiber Bragg grating SFBG1 (which is configured to cause a loss of anti-Stokes light) is located closer to the workpiece W than the slanted fiber Bragg grating SFBG2 (which is configured to cause a loss of Stokes light) is. That is, the slanted fiber Bragg grating SFBG1 is located downstream of the slanted fiber Bragg grating SFBG2. In some cases, reflected portions of Stokes light and anti-Stokes light are greater in power than outgoing portions of the Stokes light and anti-Stokes light. In such cases, the above arrangement makes it possible to cause a loss of, in an early stage, one of Stokes light and anti-Stokes light that has higher power than the other, and thus possible to reduce the foregoing unstable oscillation of laser light at the amplifying optical fiber AF or a reduction in reliability of pump light sources PS1 to PSm which supply pump light to the amplifying optical fiber AF. Note that which of the Stokes light and anti-Stokes light has higher power may be pre-set by a user or may be determined based on estimation or measurement.

In the filter device F3, the cladding mode stripper CMS is located closer to the amplifying optical fiber AF than the slanted fiber Bragg grating SFBG1 is. This makes it possible to allow anti-Stokes light having entered the filter device F3 from the laser delivery fiber LDF to transition to the cladding through use of the slanted fiber Bragg grating SFBG1 and allow the anti-Stokes light to leak out through use of the cladding mode stripper CMS. It is also possible to allow Stokes light having entered the filter device F3 from the laser delivery fiber LDF to transition to the cladding through use of the slanted fiber Bragg grating SFBG2 and allow the Stokes light to leak out through use of the cladding mode stripper CMS. The filter device F3 can be modified, for example, in the following manner.

(1) Instead of the arrangement in which the cladding mode stripper CMS is located closer to the amplifying optical fiber AF than the slanted fiber Bragg grating SFBG1 is, the filter device F3 can employ an arrangement in which the cladding mode stripper CMS is located between the two slanted fiber Bragg gratings SFBG1 and SFBG2. This makes it possible to allow anti-Stokes light having entered the filter device F3 from the amplifying optical fiber AF to transition to the cladding through use of the slanted fiber Bragg grating SFBG1 and allow the anti-Stokes light to leak out through use of the cladding mode stripper CMS. It is also possible to allow Stokes light having entered the filter device F3 from the laser delivery fiber LDF to transition to the cladding through use of the slanted fiber Bragg grating SFBG2 and allow the Stokes light to leak out through use of the cladding mode stripper CMS.

(2) Instead of the arrangement in which the cladding mode stripper CMS is located closer to the amplifying optical fiber AF than the slanted fiber Bragg grating SFBG1 is, the filter device F3 can employ an arrangement in which the cladding mode stripper CMS is located closer to the laser delivery fiber LDF than the slanted fiber Bragg grating SFBG2 is. This makes it possible to allow anti-Stokes light having entered the filter device F3 from the amplifying optical fiber AF to transition to the cladding through use of the slanted fiber Bragg grating SFBG1 and allow the anti-Stokes light to leak out through use of the cladding mode stripper CMS. It is also possible to allow Stokes light having entered the filter device F3 through the amplifying optical fiber AF to transition to the cladding through use of the slanted fiber Bragg grating SFBG2 and allow the Stokes light to leak out through use of the cladding mode stripper CMS.

(3) The filter device F3 can employ an arrangement in which a first cladding mode stripper is located closer to the amplifying optical fiber AF than the slanted fiber Bragg grating SFBG1 is and a second cladding mode stripper is located between the two slanted fiber Bragg gratings SFBG1 and SFBG2. This makes it possible to allow anti-Stokes light having entered the filter device F3 from the laser delivery fiber LDF to transition to the cladding through use of the slanted fiber Bragg grating SFBG1 and allow the anti-Stokes light to leak out through use of the first cladding mode stripper. It is also possible to allow Stokes light having entered the filter device F3 from the laser delivery fiber LDF to transition to the cladding through use of the slanted fiber Bragg grating SFBG2 and allow the Stokes light to leak out through use of the first cladding mode stripper. It is also possible to allow anti-Stokes light having entered the filter device F3 from the amplifying optical fiber AF to transition to the cladding through use of the slanted fiber Bragg grating SFBG1 and allow the anti-Stokes light to leak out through use of the second cladding mode stripper. It is also possible to allow Stokes light having entered the filter device F3 from the laser delivery fiber LDF to transition to the cladding through use of the slanted fiber Bragg grating SFBG2 and allow the Stokes light to leak out through use of the second cladding mode stripper.

(4) The filter device F3 can employ an arrangement in which a first cladding mode stripper is located closer to the amplifying optical fiber AF than the slanted fiber Bragg grating SFBG1 is and a second cladding mode stripper is located closer to the laser delivery fiber LDF than the slanted fiber Bragg grating SFBG2 is. This makes it possible to allow anti-Stokes light having entered the filter device F3 from the laser delivery fiber LDF to transition to the cladding through use of the slanted fiber Bragg grating SFBG1 and allow the anti-Stokes light to leak out through use of the first cladding mode stripper. It is also possible to allow Stokes light having entered the filter device F3 from the laser delivery fiber LDF to transition to the cladding through use of the slanted fiber Bragg grating SFBG2 and allow the Stokes light to leak out through use of the first cladding mode stripper. It is also possible to allow anti-Stokes light having entered the filter device F3 from the amplifying optical fiber AF to transition to the cladding through use of the slanted fiber Bragg grating SFBG1 and allow the anti-Stokes light to leak out through use of the second cladding mode stripper. It is also possible to allow Stokes light having entered the filter device F3 from the amplifying optical fiber AF to transition to the cladding through use of the slanted fiber Bragg grating SFBG2 and allow the Stokes light to leak out through use of the second cladding mode stripper.

(5) The filter device F3 can employ an arrangement in which a first cladding mode stripper is located between the two slanted fiber Bragg gratings SFBG1 and SFBG2 and a second cladding mode stripper is located closer to the laser delivery fiber LDF than the slanted fiber Bragg grating SFBG2 is. This makes it possible to allow anti-Stokes light having entered the filter device F3 from the amplifying optical fiber AF to transition to the cladding through use of the slanted fiber Bragg grating SFBG1 and allow the anti-Stokes light to leak out through use of the first cladding mode stripper. It is also possible to allow Stokes light having entered the filter device F3 from the laser delivery fiber LDF to transition to the cladding through use of the slanted fiber Bragg grating SFBG2 and allow the Stokes light to leak out through use of the first cladding mode stripper. It is also possible to allow anti-Stokes light having entered the filter device F3 from the amplifying optical fiber AF to transition to the cladding through use of the slanted fiber Bragg grating SFBG1 and allow the anti-Stokes light to leak out through use of the second cladding mode stripper. It is also possible to allow Stokes light having entered the filter device F3 from the amplifying optical fiber AF to transition to the cladding through use of the slanted fiber Bragg grating SFBG2 and allow the Stokes light to leak out through use of the second cladding mode stripper.

(6) The filter device F3 can employ an arrangement in which a first cladding mode stripper is located closer to the amplifying optical fiber AF than the slanted fiber Bragg grating SFBG1 is, a second cladding mode stripper is located closer to the laser delivery fiber LDF than the slanted fiber Bragg grating SFBG2 is, and a third cladding mode stripper is located between the two slanted fiber Bragg gratings SFBG1 and SFBG2. This makes it possible to allow anti-Stokes light having entered the filter device F3 from the laser delivery fiber LDF to transition to the cladding through use of the slanted fiber Bragg grating SFBG1 and allow the anti-Stokes light to leak out through use of the first cladding mode stripper. It is also possible to allow Stokes light having entered the filter device F3 from the laser delivery fiber LDF to transition to the cladding through use of the slanted fiber Bragg grating SFBG2 and allow the Stokes light to leak out through use of the first cladding mode stripper. It is also possible to allow anti-Stokes light having entered the filter device F3 from the amplifying optical fiber AF to transition to the cladding through use of the slanted fiber Bragg grating SFBG1 and allow the anti-Stokes light to leak out through use of the second cladding mode stripper. It is also possible to allow Stokes light having entered the filter device F3 from the amplifying optical fiber AF to transition to the cladding through use of the slanted fiber Bragg grating SFBG2 and allow the Stokes light to leak out through use of the second cladding mode stripper. It is also possible to allow anti-Stokes light having entered the filter device F3 from the amplifying optical fiber AF to transition to the cladding through use of the slanted fiber Bragg grating SFBG1 and allow the anti-Stokes light to leak out through use of the third cladding mode stripper. It is also possible to allow Stokes light having entered the filter device F3 from the laser delivery fiber LDF to transition to the cladding through use of the slanted fiber Bragg grating SFBG2 and allow the Stokes light to leak out through use of the third cladding mode stripper.

The above description has discussed the filter device F configured to (1) allow at least one of Stokes light and anti-Stokes light to transition to the cladding through use of a slanted fiber grating and (2) allow the at least one of Stokes light and anti-Stokes light, having transitioned to the cladding, to leak out through use of a cladding mode stripper. Note, however, that the configuration of the filter device F is not limited as such. For example, instead of the slanted fiber grating, a photonic bandgap fiber can be used to allow at least one of Stokes light and anti-Stokes light to transition to the cladding.

Additionally or alternatively, reflection of Stokes light instead of leaking of Stokes light can be used to cause a loss of Stokes light, because this results in a reduction of power of Stokes light after passing through the filter device F. Similarly, reflection of anti-Stokes light instead of leaking of anti-Stokes light can be used to cause a loss of anti-Stokes light, because this results in a reduction of power of anti-Stokes light after passing through the filter device F. Therefore, the filter device F can be a fiber Bragg grating configured to reflect light belonging to a wavelength range that includes the peak wavelength of at least one of Stokes light and anti-Stokes light in preference to light belonging to another wavelength range.

(Second Example Configuration of Filter Device)

Figure 4A:
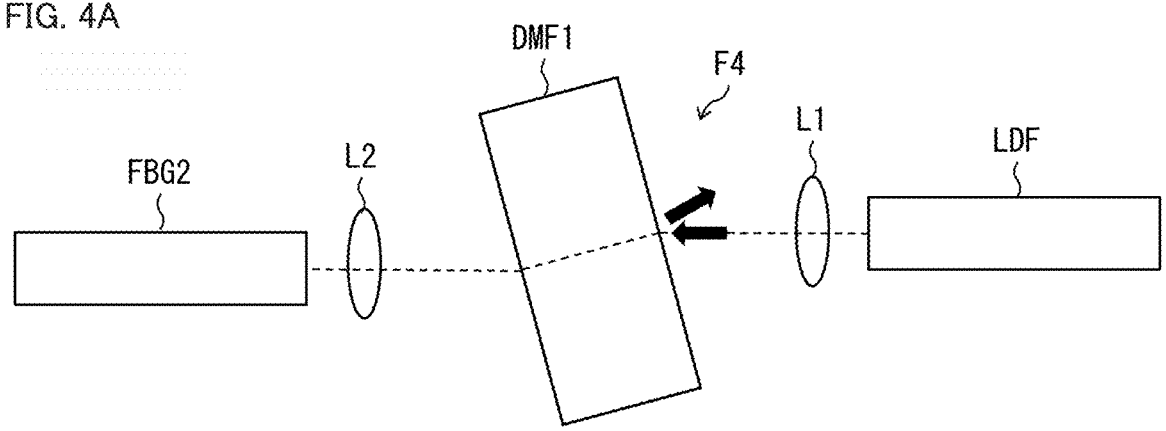
FIGS. 4A-4C show side views illustrating second example configurations of a filter included in the laser apparatus illustrated in FIG. 1.
Figure 4B:
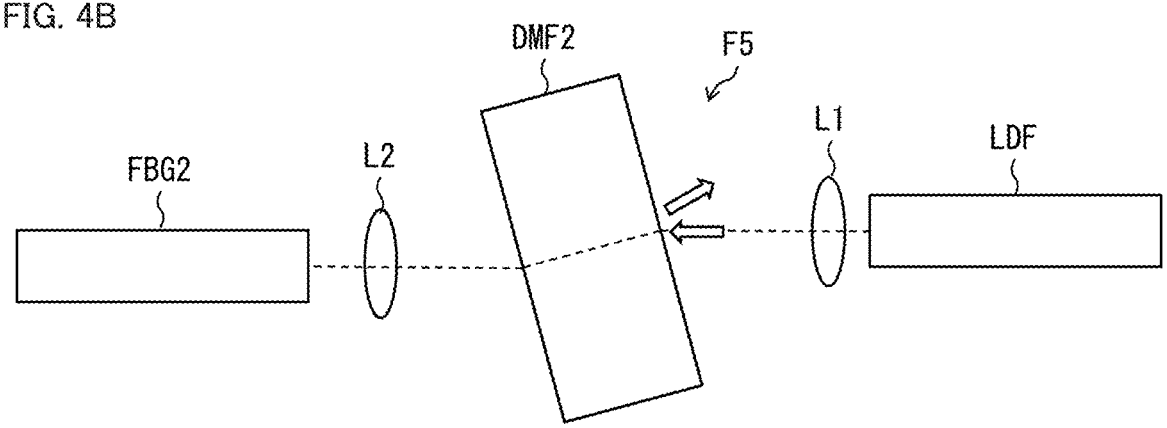
Figure 4C:
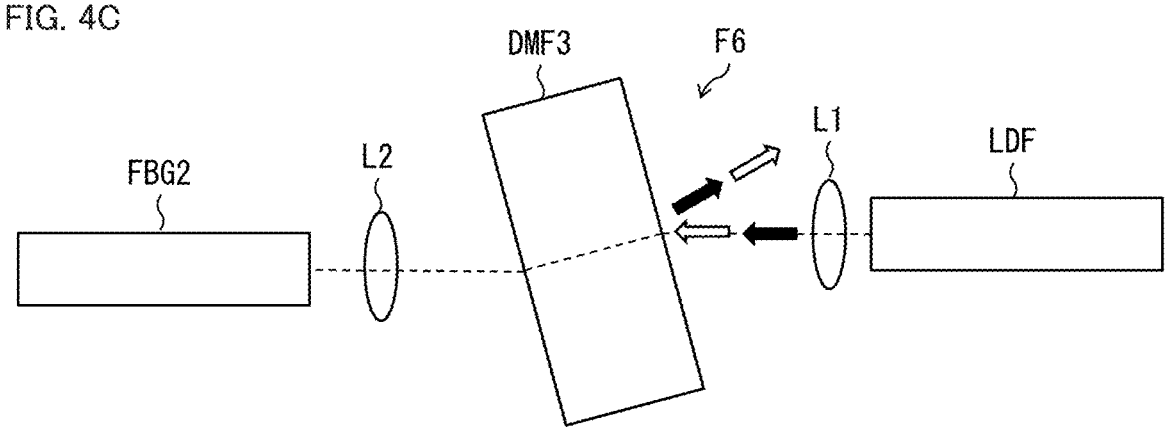

The following description will discuss, with reference to FIG. 4A-4C, second example configurations of the filter device F included in the laser apparatus 1 in accordance with one or more embodiments.

FIG. 4A is a side view illustrating an example configuration of a filter device F configured to cause a loss of light belonging to a wavelength range that includes the peak wavelength of anti-Stokes light in preference to light belonging to another wavelength range (this filter device is hereinafter referred to as "filter device F4").

The filter device F4 is a spatial filter including a lens L1, a dielectric multilayer film DMF1, and a lens L2, which are arranged in this order in a direction from the laser delivery fiber LDF toward the second fiber Bragg grating FBG2.

The dielectric multilayer film DMF1 is configured such that, for example, light belonging to the wavelength range of from 1030 nm to 1060 nm inclusive is reflected in preference to light belonging to another wavelength range. Therefore, anti-Stokes light that has entered the filter device F4 from the laser delivery fiber LDF is collimated by the lens L1 and then reflected at the dielectric multilayer film DMF1. On the contrary, laser light that has entered the filter device F4 from the laser delivery fiber LDF (1) is collimated by the lens L1, (2) passes through the dielectric multilayer film DMF1, (3) is focused by the lens L2, and (4) enters the second fiber Bragg grating FBG2. Therefore, with use of the filter device F4, it is possible to cause a loss of anti-Stokes light that has entered the filter device F4 from the laser delivery fiber LDF while reducing the loss of laser light having entered the filter device F4 from the laser delivery fiber LDF.

FIG. 4B is a side view illustrating an example configuration of a filter device F configured to cause a loss of light belonging to a wavelength range that includes the peak wavelength of Stokes light in preference to light belonging to another wavelength range (this filter device is hereinafter referred to as "filter device F5").

The filter device F5 is a spatial filter including a lens L1, a dielectric multilayer film DMF2, and a lens L2, which are arranged in this order in a direction from the laser delivery fiber LDF toward the second fiber Bragg grating FBG2.

The dielectric multilayer film DMF2 is configured such that, for example, light belonging to the wavelength range of from 1080 nm to 1110 nm inclusive is reflected in preference to light belonging to another wavelength range. Therefore, Stokes light that has entered the filter device F5 from the laser delivery fiber LDF is collimated by the lens L1 and then reflected at the dielectric multilayer film DMF2. On the contrary, laser light that has entered the filter device F5 from the laser delivery fiber LDF (1) is collimated by the lens L1, (2) passes through the dielectric multilayer film DMF2, (3) is focused by the lens L2, and (4) enters the second fiber Bragg grating FBG2. Therefore, with use of the filter device F5, it is possible to cause a loss of Stokes light that has entered the filter device F5 from the laser delivery fiber LDF while reducing the loss of laser light having entered the filter device F5 from the laser delivery fiber LDF.

FIG. 4C is a side view illustrating an example configuration of a filter device F configured to cause a loss of light belonging to a wavelength range that includes the peak wavelengths of both anti-Stokes light and Stokes light in preference to light belonging to another wavelength range (this filter device is hereinafter referred to as "filter device F6").

The filter device F6 is a spatial filter including a lens L1, a dielectric multilayer film DMF3, and a lens L2, which are arranged in this order in a direction from the laser delivery fiber LDF toward the second fiber Bragg grating FBG2.

The dielectric multilayer film DMF3 is configured such that, for example, light belonging to the wavelength range of from 1030 nm to 1060 nm inclusive, and, for example, light belonging to the wavelength range of from 1080 nm to 1110 nm inclusive, are reflected in preference to light belonging to another wavelength range. Therefore, anti-Stokes light and Stokes light that have entered the filter device F6 from the laser delivery fiber LDF are collimated by the lens L1 and then reflected at the dielectric multilayer film DMF3. On the contrary, laser light that has entered the filter device F6 from the laser delivery fiber LDF (1) is collimated by the lens L1, (2) passes through the dielectric multilayer film DMF3, (3) is focused by the lens L2, and (4) enters the second fiber Bragg grating FBG2. Therefore, with use of the filter device F6, it is possible to cause a loss of Stokes light that has entered the filter device F6 from the laser delivery fiber LDF while reducing the loss of laser light having entered the filter device F6 from the laser delivery fiber LDF.

Note that the filter device F or a filter element included in the filter device F may either be a distributed filter device or element or a multistage filter device or element. As used herein, the "distributed filter device or element" means a filter device or element in which filter functions (functions such as reflection, conversion) vary in a direction of light propagation (lengthwise direction of the device or element). The "multistage filter device or element" means a filter element or filter device composed of a plurality of filter devices or filter elements arranged in the direction of light propagation (lengthwise direction of the device or element).

Figure 5:
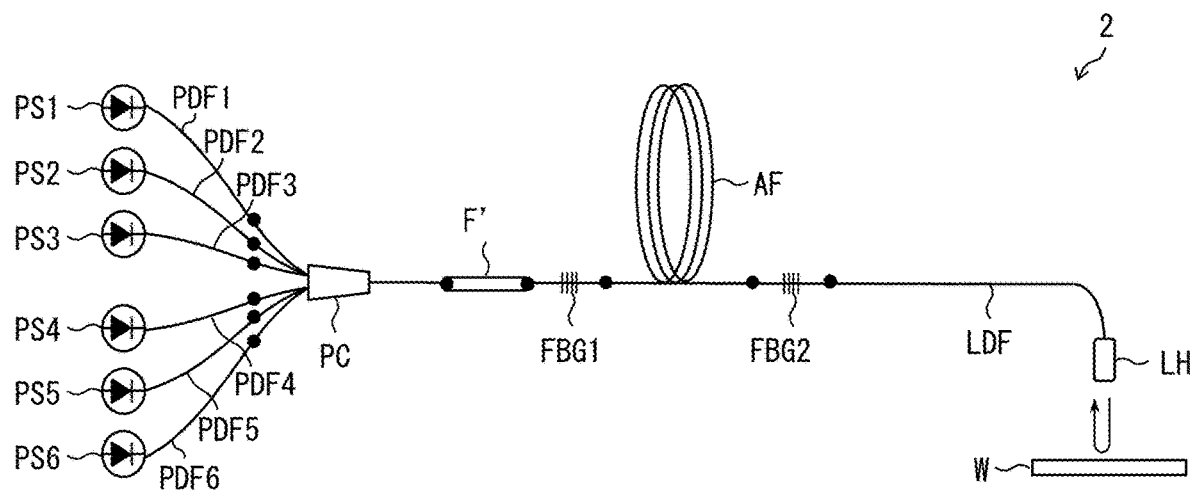
FIG. 5 is a block diagram illustrating a configuration of a laser apparatus in accordance with one or more embodiments of the present invention.

The following description will discuss a laser apparatus 2 in accordance with one or more embodiments of the present invention, with reference to FIG. 5. FIG. 5 is a block diagram illustrating a configuration of the laser apparatus 2.

The laser apparatus 2 is a fiber laser apparatus for machining, and causes oscillation of single wavelength laser light. As illustrated in FIG. 2, the laser apparatus 2 includes m pump light sources PS1 to PSm, m pump delivery fibers PDF1 to PDFm, a pump combiner PC, an amplifying optical fiber AF, two fiber Bragg gratings FBG1 and FBG2, a laser delivery fiber LDF, a laser head LH, and a filter device F' as a filter device.

The functions and arrangement of the pump light sources PS1 to PSm, the pump delivery fibers PDF1 to PDFm, the pump combiner PC, the amplifying optical fiber AF, the fiber Bragg gratings FBG1 and FBG2, the laser delivery fiber LDF, and the laser head LH included in the laser apparatus 2 in accordance with one or more embodiments are the same as the functions and arrangement of the pump light sources PS1 to PSm, the pump delivery fibers PDF1 to PDFm, the pump combiner PC, the amplifying optical fiber AF, the fiber Bragg gratings FBG1 and FBG2, the laser delivery fiber LDF, and the laser head LH included in the laser apparatus 1 in accordance with one or more embodiments, respectively. Therefore, descriptions for these features are omitted here.

The laser apparatus 2 in accordance with one or more embodiments includes the filter device F', which is located between the pump combiner PC and the first fiber Bragg grating FBG1 or provided at a multi-mode fiber residing between the pump combiner PC and the first fiber Bragg grating FBG1. Similarly to the filter device F of the laser apparatus 1 in accordance with one or more embodiments, the filter device F' is also configured to cause a loss of light belonging to a wavelength range that includes the peak wavelength of at least one of Stokes light and anti-Stokes light resulting from, in the laser delivery fiber LDF, four-wave mixing in which a plurality of guide modes are involved in preference to light belonging to another wavelength range. Furthermore, in a case where a fiber located upstream of the amplifying optical fiber AF is constituted by a multi-mode mode fiber, for example, in a case where the pump delivery fibers PDF1 to PDFm are constituted by multi-mode fibers, the filter device F' is configured to cause a loss of, in preference to light belonging to another wavelength range, light belonging to a wavelength range that includes the peak wavelength of at least one of Stokes light and anti-Stokes light resulting from four-wave mixing in which a plurality of guide modes are involved, which are generated in the pump delivery fibers PDF1 to PDFm in the absence of the filter F' or which are guided from the amplifying optical fiber AF to the pump delivery fibers PDF1 to PDFm. This makes it possible to reduce the power of at least one of Stokes light and anti-Stokes light going out of the amplifying optical fiber AF via the first fiber Bragg grating FBG1.

In the laser apparatus 1 in accordance with one or more embodiments, the filter device F is located between the laser delivery fiber LDF and the second fiber Bragg grating FBG2 or at a multi-mode fiber residing between the pump combiner PC and the first fiber Bragg grating FBG1. It is thus possible to reduce the power of at least one of unamplified Stokes light and anti-Stokes light before entering the amplifying fiber AF via the second fiber Bragg grating FBG2. Therefore, the filter device F of the laser apparatus 1 in accordance with one or more embodiments is greatly effective especially for the purpose of reducing unstable oscillation at the amplifying optical fiber AF. In contrast, in the laser apparatus 2 in accordance with one or more embodiments, the filter device F' is located between the first fiber Bragg grating FBG1 and the pump combiner PC or at a multi-mode fiber residing between the pump combiner PC and the first fiber Bragg grating FBG1. It is thus possible to reduce the power of at least one of amplified Stokes light and anti-Stokes light going out of the amplifying fiber AF via the first fiber Bragg grating FBG1. Therefore, the filter device F of the laser apparatus 1 in accordance with one or more embodiments is greatly effective especially for the purpose of reducing a reduction in reliability of the pump light sources PS1 to PSm.

Note that, in the laser apparatus 2 in accordance with one or more embodiments, no Stokes light or anti-Stokes light enters the filter device F' from the pump light sources PS1 to PSm. Therefore, even in a case where the filter device F' is comprised of a reflective element such as a fiber Bragg grating, it is possible to eliminate or reduce the likelihood that Stokes light and anti-Stokes light incident from the amplifying optical fiber AF to the filter device F' will enter the pump light sources PS1 to PSm by being reflected at the filter device F'. This makes it possible to reduce a reduction in reliability of the pump light sources PS1 to PSm.

Note that, in the laser apparatus 2 in accordance with one or more embodiments, the filter device F' is preferably constituted by a spatial filter. This is because a filter device constituted by a spatial filter allows less leakage of pump light than a filter device comprised of a cladding mode stripper. Note that examples of a spatial filter are described in the second example configurations of the filter device F discussed in one or more embodiments.

[Remarks on One or More Embodiments]

The laser apparatus 1 discussed in one or more embodiments is a resonator-type fiber laser apparatus in which a filter device F is provided at a laser delivery fiber LDF. The laser apparatus 2 discussed in one or more embodiments is a resonator-type fiber laser apparatus in which a filter device F' is provided between a pump combiner PC and a first fiber Bragg grating FBG1. Note, however, that, in a resonator-type fiber laser apparatus, places where the filter device F can be located are not limited to the above. For example, a filter device which is configured to cause a loss of light, belonging to a wavelength range that includes the peak wavelength of at least one of Stokes light and anti-Stokes light resulting from four-wave mixing in which a plurality of guide modes are involved, in preference to light belonging to another wavelength may be provided at an amplifying optical fiber AF.

Figure 6:
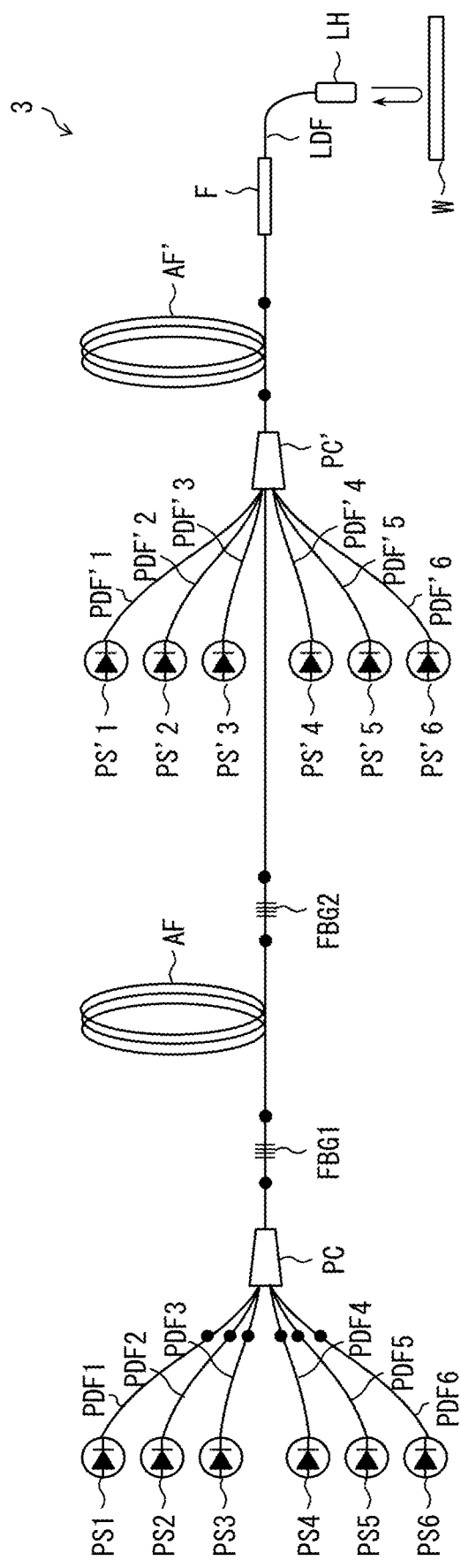
FIG. 6 is a block diagram illustrating a configuration of a laser apparatus in accordance with one or more embodiments of the present invention.

The following description will discuss a laser apparatus 3 in accordance with one or more embodiments of the present invention, with reference to FIG. 6. FIG. 6 is a block diagram illustrating a configuration of the laser apparatus 3.

The laser apparatus 3 is a fiber laser apparatus for machining, and causes oscillation of single wavelength laser light. As illustrated in FIG. 6, the laser apparatus 3 includes m pump light sources PS1 to PSm, m pump delivery fibers PDF1 to PDFm, a pump combiner PC, an amplifying optical fiber AF, two fiber Bragg gratings FBG1 and FBG2, k pump light sources PS'1 to PS'k, k pump delivery fibers PDF'1 to PDF'k, a pump combiner PC', an amplifying optical fiber AF', a laser delivery fiber LDF, a laser head LH, and a filter device F.

The pump light sources PS1 to PSm, the pump delivery fibers PDF1 to PDFm, the pump combiner PC, the amplifying optical fiber AF, the fiber Bragg gratings FBG1 and FBG2, the laser delivery fiber LDF, and the laser head LH included in the laser apparatus 3 in accordance with one or more embodiments have the same configurations as the pump light sources PS1 to PSm, the pump delivery fibers PDF1 to PDFm, the pump combiner PC, the amplifying optical fiber AF, the fiber Bragg gratings FBG1 and FBG2, the laser delivery fiber LDF, and the laser head LH included in the laser apparatus 1 in accordance with one or more embodiments, respectively.

The following description will discuss the pump light sources PS'1 to PS'k, the pump delivery fibers PDF'1 to PDF'k, the pump combiner PC', and the amplifying optical fiber AF', which are provided between the second fiber Bragg grating FBG2 and the laser delivery fiber LDF. Note that the pump light sources PS'1 to PS'k and the pump delivery fibers PDF'1 to PDF'k are in one-to-one correspondence with each other. Note here that k is a natural number of 2 or more, and represents the number of the pump light sources PS'1 to PS'k and the number of the pump delivery fibers PDF'1 to PDF'k. FIG. 6 shows an example of a configuration of the laser apparatus 3 in a case where k=6.

Each of the pump light sources PS'j (j is a natural number of 1 or more and k or less) emits pump light. The pump light can be, for example, laser light having a peak wavelength of 975±3 nm or 915±3 nm. In one or more embodiments, the pump light sources PS'1 to PS'k are laser diodes. Each of the pump light sources PS'j is connected to an input end of a corresponding pump delivery fiber PDF'j. The pump light emitted by the pump light sources PS'j is introduced into respective corresponding pump delivery fibers PDF'i.

The pump delivery fibers PDF'j guide the pump light emitted by the corresponding pump light sources PS'j. Output ends of the pump delivery fibers PDF'j are connected to an input port of the pump combiner PC'. The pump light guided through the pump delivery fibers PDF'j is introduced into the pump combiner PC' via the input port.

The pump combiner PC' combines pump light guided through the pump delivery fibers PDF'1 to PDF'k. An output port of the pump combiner PC' is connected to an input end of the amplifying optical fiber AF'. The pump light combined at the pump combiner PC' is introduced into the amplifying optical fiber AF'.

The amplifying optical fiber AF' uses the pump light that has been combined at the pump combiner PC' to thereby amplify laser light belonging to a specific wavelength range (hereinafter referred to as "amplification bandwidth"). In one or more embodiments, the amplifying optical fiber AF is a double-clad fiber having a core doped with a rare-earth element (such as ytterbium, thulium, cerium, neodymium, europium, erbium, and/or the like). In this case, the pump light combined at the pump combiner PC' is used to keep the rare-earth element in population inversion state. For example, in a case where the rare-earth element contained in the core is ytterbium, the amplification bandwidth of the amplifying optical fiber AF' is, for example, the wavelength range of from 1000 nm to 1100 nm inclusive. Note, here, that the peak wavelength of laser light in the claims is, for example, equal to or substantially equal to the peak wavelength of laser light outputted from an MO section (described later), in a multi-mode fiber that is present inside the MO section. Alternatively, in a case where a wavelength conversion element is provided downstream of the MO section, the peak wavelength of laser light in the claims in a multi-mode fiber located upstream of the wavelength conversion element is equal to or substantially equal to the peak wavelength of laser light outputted from the MO section, and the peak wavelength of laser light in the claims in a multi-mode fiber located downstream of the wavelength conversion element is equal to or substantially equal to the peak wavelength of laser light obtained through conversion, by the wavelength conversion element, of the laser light outputted from the MO section. In a case where no wavelength conversion element is present downstream of the MO section, the peak wavelength of laser light in the claims in a multi-mode fiber located downstream of the MO section is equal to or substantially equal to the peak wavelength of laser light outputted from the MO section.

The laser apparatus 3 thus configured functions as a MOPA-type fiber laser in which (i) the pump light sources PS1 to PSm, the pump delivery fibers PDF1 to PDFm, the pump combiner PC, the amplifying optical fiber AF, and the fiber Bragg gratings FBG1 and FBG2 serve as the MO (master oscillator) section and (ii) the pump light sources PS'1 to PS'k, the pump delivery fibers PDF'1 to PDF'k, the pump combiner PC', and the amplifying optical fiber AF' serve as a power amplifier (PA) section. The peak wavelength of laser light that is guided through the laser delivery fiber LDF and applied to a workpiece W via the laser head LH is, for example, in a case where no wavelength conversion element is provided downstream of the MO section, equal to or substantially equal to the oscillation wavelength of the MO section. Alternatively, in a case where a wavelength conversion element is provided downstream of the MO section, the peak wavelength of the laser light is equal to the peak wavelength of laser light obtained through conversion, by the wavelength conversion element, of laser light outputted from the MO section.

In the laser apparatus 3 in accordance with one or more embodiments, laser light amplified at the amplifying optical fiber AF' is guided through the laser delivery fiber LDF which is a multi-mode fiber. Furthermore, in the laser apparatus 3 in accordance with one or more embodiments, laser light reflected at the workpiece W is guided through the laser delivery fiber LDF which is a multi-mode fiber. In this process, Stokes light is amplified and anti-Stokes light is generated by four-wave mixing in which a plurality of guide modes are involved. Note that the amplifying optical fiber AF' can also be a multi-mode fiber. In this case, also in the amplifying optical fiber AF', Stokes light is amplified and anti-Stokes light is generated by four-wave mixing in which a plurality of guide modes are involved.

The filter device F of the laser apparatus 3 in accordance with one or more embodiments is, similarly to the filter device F of the laser apparatus 1 in accordance with one or more embodiments, configured to cause a loss of light belonging to a wavelength range that includes at least one of Stokes light and anti-Stokes light in preference to light belonging to another wavelength range. Therefore, according to the laser apparatus 3, the filter device F included in the laser apparatus 3, or a filter element included in the filter device F in accordance with one or more embodiments, it is possible to keep the power of Stokes light and anti-Stokes light low.

Furthermore, the filter device F of the laser apparatus 3 in accordance with one or more embodiments is, similarly to the filter device F of the laser apparatus 1 in accordance with one or more embodiments, located at the laser delivery fiber LDF. The filter device F may be (a) configured to cause a loss of at least one of Stokes light and anti-Stokes light guided through the laser delivery fiber LDF in a direction from the downstream end to the upstream end, (b) configured to cause a loss of at least one of Stokes light and anti-Stokes light guided through the laser delivery fiber LDF in a direction from the upstream end to the downstream end, or (c) configured to cause a loss of at least one of Stokes light and anti-Stokes light guided through the laser delivery fiber LDF in the direction from the downstream end to the upstream end and cause a loss of at least one of Stokes light and anti-Stokes light guided through the laser delivery fiber LDF in the direction from the upstream end to the downstream end. As used herein, the term "downstream end" refers to an end nearer the workpiece W, and the term "upstream end" refers to an end opposite the downstream end, i.e., the end more distant from the workpiece W.

In a case where the filter device F employs the above configuration (a), at least one of Stokes light and anti-Stokes light guided through the laser delivery fiber LDF in the direction from the downstream end to the upstream end is reduced in its power by the filter device F and then enters the amplifying optical fiber AF'. Therefore, the power of at least one of Stokes light and anti-Stokes light entering the amplifying optical fiber AF' is less than in a case where the filter device F is absent. This makes it possible to reduce the likelihood that Stokes light and anti-Stokes light will make the amplification of laser light unstable at the amplifying fiber AF'. It is also possible to reduce the likelihood that Stokes light and anti-Stokes light will make the amplification of laser light unstable at the amplifying fiber AF. It is also possible to reduce the likelihood that the reliability of either of or both of the pump light sources PS1 to PSm and the pump light sources PS'1 to PS'k will decrease.

Alternatively, in a case where the filter device F employs the foregoing configuration (b), at least one of Stokes light and anti-Stokes light guided through the laser delivery fiber LDF in the direction from the upstream end to the downstream end is reduced in its power by the filter device F and then applied to the workpiece W. Therefore, the power of at least one of Stokes light and anti-Stokes light applied to the workpiece W is less than in a case where the filter device F is absent. This makes it possible to reduce (1) the likelihood that working properties will decrease due to defocus resulting from chromatic aberration, (2) the likelihood that the beam spot will not be easily focused at a desired position, and (3) the likelihood that a component will accidentally generate heat or deteriorate when the component has different absorption characteristics for different wavelengths.

Alternatively, in a case where the filter device F employs the foregoing configuration (c), it is possible to obtain both the effects obtained in the case where the filter device F employs the configuration (a) and the effects obtained in the case where the filter device F employs the configuration (b).

Note that, in one or more embodiments, arrangements of the laser apparatus 1 can also be employed in the laser apparatus 3. In a case where an arrangement of laser apparatus 1 is employed in the laser apparatus 3, effects corresponding to the employed arrangement are also obtained in the laser apparatus 3. Furthermore, in one or more embodiments, example configurations of the filter device F used in laser apparatus 1 can be also employed in the filter device F of the laser apparatus 3. In a case where an example configuration of the filter device F used in laser apparatus 1 is employed in the filter device F of the laser apparatus 3, effects corresponding to the employed example configuration are also obtained in the laser apparatus 3 in accordance.

Figure 7:
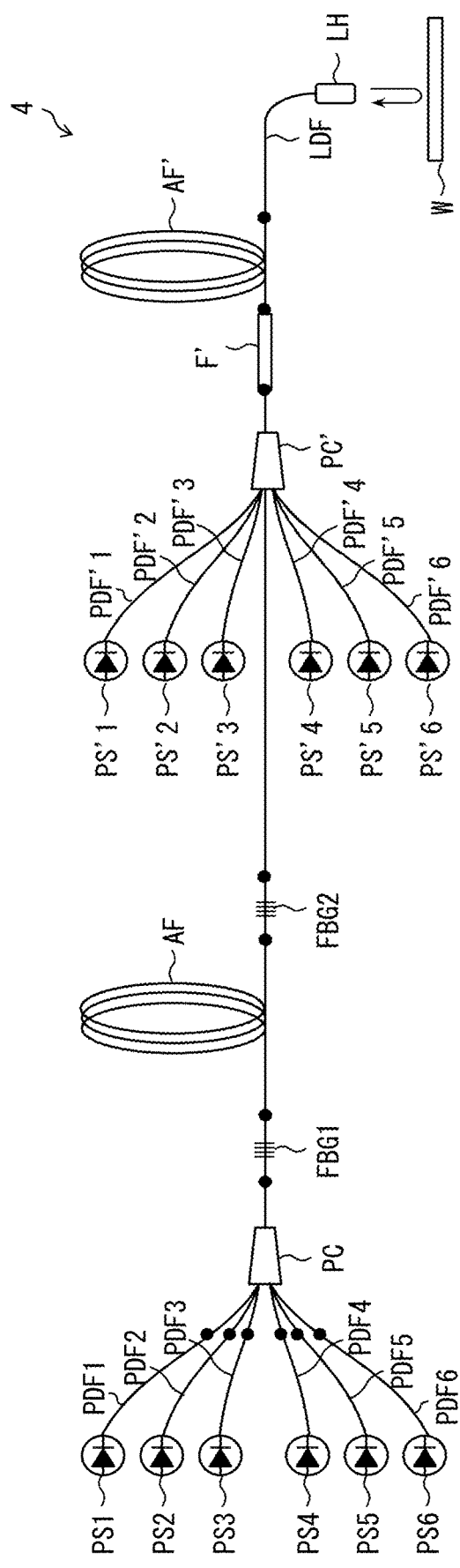
FIG. 7 is a block diagram illustrating a configuration of a laser apparatus in accordance with one or more embodiments of the present invention.

The following description will discuss a laser apparatus 4 in accordance with one or more embodiments of the present invention, with reference to FIG. 7. FIG. 7 is a block diagram illustrating a configuration of the laser apparatus 4. As illustrated in FIG. 7, the laser apparatus 4 in accordance with one or more embodiments is different from the laser apparatus 3 in that the filter device F at the laser delivery fiber LDF is replaced by a filter device F' that is provided at a multi-mode fiber which connects the pump combiner PC' (output port of the pump combiner PC') and the amplifying optical fiber AF'.

The filter device F' of the laser apparatus 4 in accordance with one or more embodiments is, similarly to the filter device F of the laser apparatus 3 in accordance with one or more embodiments, configured to cause a loss of light belonging to a wavelength range that includes at least one of Stokes light and anti-Stokes light in preference to light belonging to another wavelength range. Therefore, according to the laser apparatus 4, the filter device F' included in the laser apparatus 4, or a filter element included in the filter device F' in accordance with one or more embodiments, it is possible to keep the power of Stokes light and anti-Stokes light low.

Furthermore, the filter device F' of the laser apparatus 4 in accordance with one or more embodiments is, differently from the filter device F of the laser apparatus 3 in accordance with one or more embodiments, located at a multi-mode fiber which connects the pump combiner PC' and the amplifying optical fiber AF'. In this case, the filter device F' may be (a) configured to cause a loss of at least one of Stokes light and anti-Stokes light guided through the amplifying optical fiber AF' in the direction from the downstream end to the upstream end, (b) configured to cause a loss of at least one of Stokes light and anti-Stokes light guided through the pump combiner PC' in the direction from the upstream end to the downstream end, or (c) configured to cause a loss of at least one of Stokes light and anti-Stokes light guided through the amplifying optical fiber AF' in the direction from the downstream end to the upstream end and cause a loss of at least one of Stokes light and anti-Stokes light guided through the pump combiner PC' in the direction from the upstream end to the downstream end. As used herein, the term "downstream end" refers to an end nearer the workpiece W, and the term "upstream end" refers to an end opposite the downstream end, i.e., the end more distant from the workpiece W.

In a case where the filter device F' employs the above configuration (a), at least one of Stokes light and anti-Stokes light guided through the amplifying optical fiber AF' in the direction from the downstream end to the upstream end is reduced in its power by the filter device F' and then enters the pump light sources PS'1 to PS'k via the pump combiner PC', in some cases. This makes it possible to reduce the likelihood that Stokes light and anti-Stokes light will make the amplification of laser light unstable at the amplifying fiber AF'. The power of Stokes light and anti-Stokes light entering the pump light sources PS'1 to PS'k is less than in a case where the filter device F' is absent. This makes it possible to reduce the likelihood that Stokes light and anti-Stokes light will reduce the reliability of the pump light sources PS'1 to PS'k.

Alternatively, in a case where the filter device F' employs the foregoing configuration (b), at least one of Stokes light and anti-Stokes light guided through the pump combiner PC' in the direction from the upstream end to the downstream end is reduced in its power by the filter device F' and then enters the amplifying optical fiber AF'. Therefore, the power of Stokes light and anti-Stokes light entering the amplifying optical fiber AF' is less than in a case where the filter device F' is absent. This makes it possible to reduce the likelihood that Stokes light and anti-Stokes light will make the amplification of laser light unstable at the amplifying optical fiber AF'. It is also possible to reduce the likelihood that Stokes light and anti-Stokes light will make the amplification of laser light unstable at the amplifying optical fiber AF'. It is also possible to reduce the likelihood that the reliability of the pump light sources PS1 to PSm will decrease.

Alternatively, in a case where the filter device F' employs the foregoing configuration (c), it is possible to obtain both the effects obtained in the case where the filter device F' employs the configuration (a) and the effects obtained in the case where the filter device F' employs the configuration (b).

Note that, in one or more embodiments, arrangements of the laser apparatus 1 can also be employed in the laser apparatus 4. In a case where an arrangement of laser apparatus 1 is employed in the laser apparatus 4, effects corresponding to the employed arrangement are also obtained in the laser apparatus. Furthermore, in one or more embodiments, example configurations of the filter device F used in laser apparatus 1 can also be employed in the filter device F' of the laser apparatus 4. In a case where an example configuration of the filter device F used in laser apparatus 1 is employed in the filter device F' of the laser apparatus 4, effects corresponding to the employed example configuration are also obtained in the laser apparatus 4 in accordance.

Figure 8:
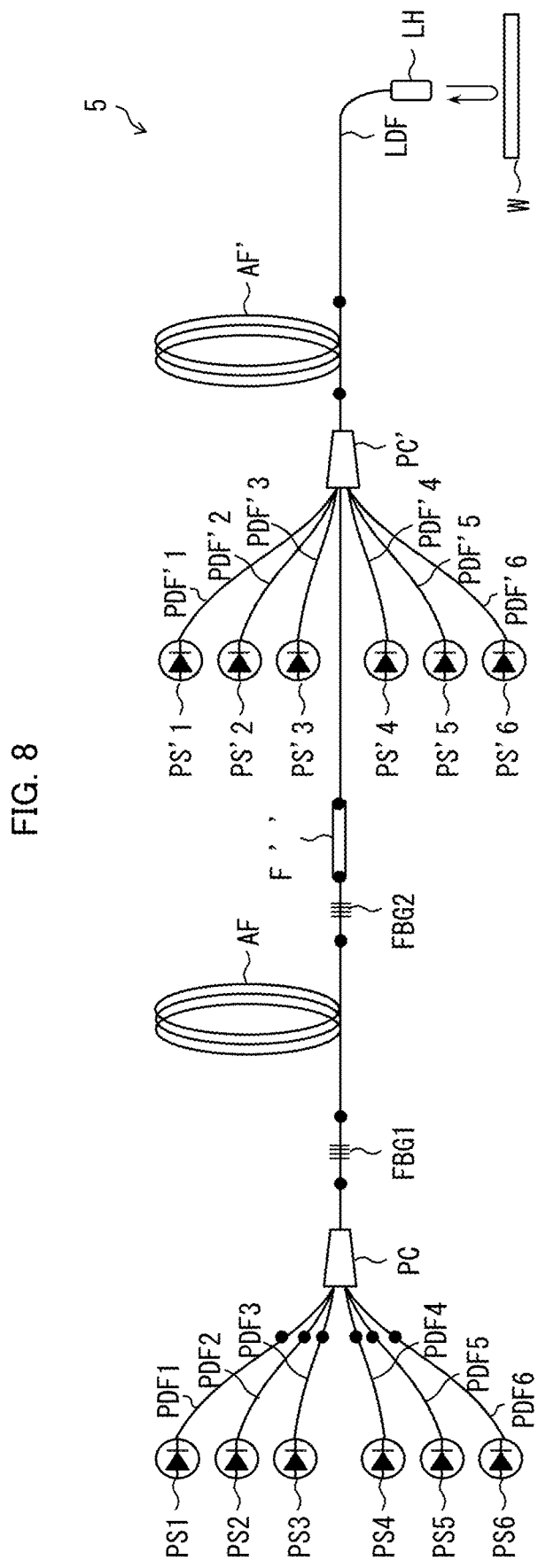
FIG. 8 is a block diagram illustrating a configuration of a laser apparatus in accordance with one or more embodiments of the present invention.

The following description will discuss a laser apparatus 5 in accordance with one or more embodiments of the present invention, with reference to FIG. 8. FIG. 8 is a block diagram illustrating a configuration of the laser apparatus 5. As illustrated in FIG. 8, the laser apparatus 5 in accordance with one or more embodiments is different from the laser apparatus 3 in accordance with one or more embodiments in that the filter device F at the laser delivery fiber LDF is replaced by a filter device F" that is provided at a multi-mode fiber which connects the second fiber Bragg grating FBG2 and the pump combiner PC' (input port of the pump combiner PC').

The filter device F" of the laser apparatus 5 in accordance with one or more embodiments is, similarly to the filter device F of the laser apparatus 3 in accordance with one or more embodiments, configured to cause a loss of light belonging to a wavelength range that includes at least one of Stokes light and anti-Stokes light in preference to light belonging to another wavelength range. Therefore, according to the laser apparatus 5, the filter device F" included in the laser apparatus 5, or a filter element included in the filter device F" in accordance with one or more embodiments, it is possible to keep the power of Stokes light and anti-Stokes light low.

The filter device F" of the laser apparatus 5 in accordance with one or more embodiments is, differently from the filter device F of the laser apparatus 3 in accordance with one or more embodiments, located at a multi-mode fiber which connects the second fiber Bragg grating FBG2 and the pump combiner PC'. The filter device F" may be (a) configured to cause a loss of at least one of Stokes light and anti-Stokes light guided through the pump combiner PC' in the direction from the downstream end to the upstream end, (b) configured to cause a loss of at least one of Stokes light and anti-Stokes light guided through the second fiber Bragg grating FBG2 in the direction from the upstream end to the downstream end, or (c) configured to cause a loss of at least one of Stokes light and anti-Stokes light guided through the pump combiner PC' in the direction from the downstream end to the upstream end and cause a loss of Stokes light and anti-Stokes light guided through the second fiber Bragg grating FBG2 in the direction from the upstream end to the downstream end. As used herein, the term "downstream end" refers to an end nearer the workpiece W, and the term "upstream end" refers to an end opposite the downstream end, i.e., the end more distant from the workpiece W.

In a case where the filter device F" employs the above configuration (a), at least one of Stokes light and anti-Stokes light guided through the pump combiner PC' in the direction from the downstream end to the upstream end is reduced in its power by the filter device F'' and then enters the amplifying optical fiber AF via the second fiber Bragg grating FBG2. Therefore, the power of Stokes light and anti-Stokes light entering the amplifying optical fiber AF is less than in a case where the filter device F'' is absent. This makes it possible to reduce the likelihood that Stokes light and anti-Stokes light will make the amplification of laser light unstable at the amplifying fiber AF. It is also possible to reduce the likelihood that the reliability of the pump light sources PS1 and PSm will decrease.

Alternatively, in a case where the filter device F'' employs the foregoing configuration (b), at least one of Stokes light and anti-Stokes light guided through the second fiber Bragg grating FBG2 in the direction from the upstream end to the downstream end is reduced in its power by the filter device F'' and then enters the amplifying optical fiber AF' via the pump combiner PC'. Therefore, the power of Stokes light and anti-Stokes light entering the amplifying optical fiber AF' is less than in a case where the filter device F'' is absent. This makes it possible to reduce the likelihood that Stokes light and anti-Stokes light will make the amplification of laser light unstable at the amplifying optical fiber AF'.

Alternatively, in a case where the filter device F'' employs the foregoing configuration (c), it is possible to obtain both the effects obtained in the case where the filter device F'' employs the configuration (a) and the effects obtained in the case where the filter device F'' employs the configuration (b).

Note that, in one or more embodiments, arrangements of the laser apparatus 1 can also be employed in the laser apparatus 5. In a case where an arrangement of laser apparatus 1 is employed in the laser apparatus 5, effects corresponding to the employed arrangement are also obtained in the laser apparatus 5. Furthermore, in one or more embodiments, example configurations of the filter device F used in laser apparatus 1 can also be employed in the filter device F'' of the laser apparatus 5. In a case where an example configuration of the filter device F used in laser apparatus 1 is employed in the filter device F'' of the laser apparatus 5, effects corresponding to the employed example configuration are also obtained in the laser apparatus 5 in accordance.

Note that, in the laser apparatus 5 in accordance with one or more embodiments, the filter device F'' is preferably constituted by a spatial filter. This is because a filter device constituted by a spatial filter allows less leakage of pump light than a filter device comprised of a cladding mode stripper. Note that examples of a spatial filter are described in the second example configurations of the filter device F discussed in one or more embodiments.

Figure 9:
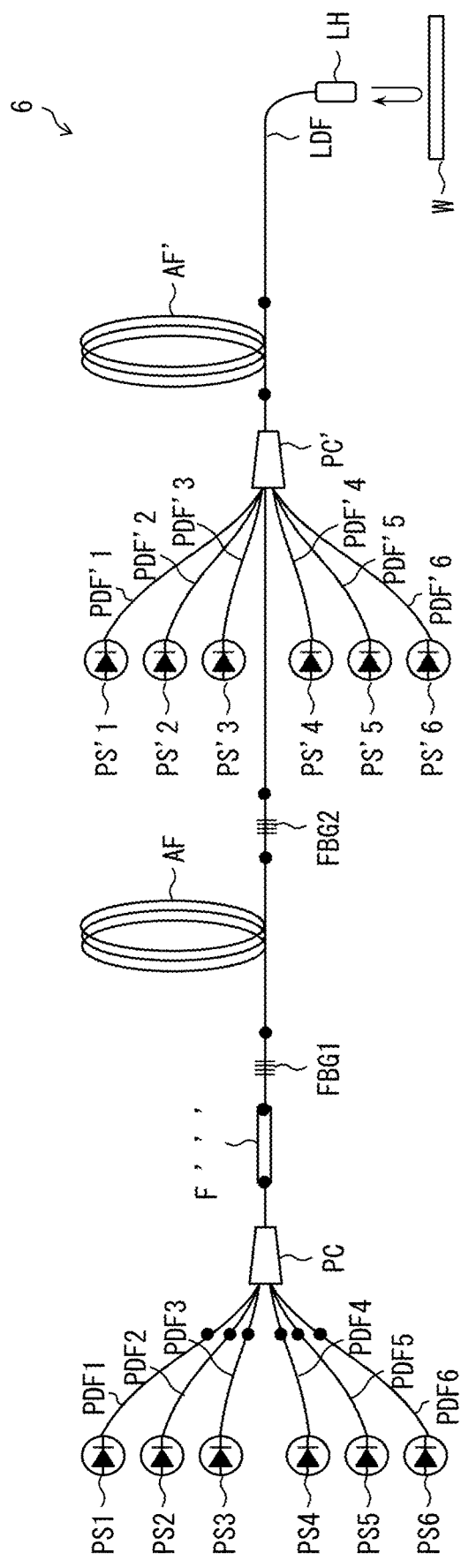
FIG. 9 is a block diagram illustrating a configuration of a laser apparatus in accordance with one or more embodiments of the present invention.

The following description will discuss a laser apparatus 6 in accordance with one or more embodiments of the present invention, with reference to FIG. 9. FIG. 9 is a block diagram illustrating a configuration of the laser apparatus 6. As illustrated in FIG. 9, the laser apparatus 6 in accordance with one or more embodiments is different from the laser apparatus 3 in accordance with one or more embodiments in that the filter device F at the laser delivery fiber LDF is replaced by a filter device F''' that is provided at a multi-mode fiber which connects the pump combiner PC (output port of the pump combiner PC) and a first fiber Bragg grating FBG1.

The filter device F''' of the laser apparatus 6 in accordance with one or more embodiments is, similarly to the filter device F of the laser apparatus 3 in accordance with one or more embodiments, configured to cause a loss of light belonging to a wavelength range that includes at least one of Stokes light and anti-Stokes light in preference to light belonging to another wavelength range. Therefore, according to the laser apparatus 6, the filter device F''' included in the laser apparatus 6, or a filter element included in the filter device F''' in accordance with one or more embodiments, it is possible to keep the power of Stokes light and anti-Stokes light low.

Furthermore, the filter device F''' of the laser apparatus 6 in accordance with one or more embodiments is, differently from the filter device F of the laser apparatus 3 in accordance with one or more embodiments, located at a multi-mode fiber which connects the pump combiner PC and the first fiber Bragg grating FBG1. The filter device F''' may be (a) configured to cause a loss of at least one of Stokes light and anti-Stokes light guided through the first fiber Bragg grating FBG1 in the direction from the downstream end to the upstream end, (b) configured to cause a loss of at least one of Stokes light and anti-Stokes light guided through the pump combiner PC in the direction from the upstream end to the downstream end, or (c) configured to cause a loss of at least one of Stokes light and anti-Stokes light guided through the first fiber Bragg grating FBG1 in the direction from the downstream end to the upstream end and cause a loss of Stokes light and anti-Stokes light guided through the pump combiner PC in the direction from the upstream end to the downstream end. As used herein, the term "downstream end" refers to an end nearer the workpiece W, and the term "upstream end" refers to an end opposite the downstream end, i.e., the end more distant from the workpiece W.

In a case where the filter device F''' employs the above configuration (a), at least one of Stokes light and anti-Stokes light guided through the first fiber Bragg grating FBG1 in the direction from the downstream end to the upstream end is reduced in its power by the filter device F''' and then enters the pump light sources PS1 to PSm via the pump combiner PC, in some cases. Therefore, in this case, the power of Stokes light and anti-Stokes light entering the pump light sources PS1 to PSm is less than in a case where the filter device F''' is absent. This makes it possible to reduce the likelihood that Stokes light and anti-Stokes light will reduce the reliability of the pump light sources PS1 to PSm.

Alternatively, in a case where the filter device F''' employs the foregoing configuration (b), at least one of Stokes light and anti-Stokes light guided through the pump combiner PC from the upstream end to the downstream end is reduced in its power by the filter device F''' and then enters the amplifying optical fiber AF via the first fiber Bragg grating FBG1. Therefore, the power of Stokes light and anti-Stokes light entering the amplifying optical fiber AF is less than in a case where the filter device F''' is absent. This makes it possible to reduce the likelihood that Stokes light and anti-Stokes light will make the amplification of laser light unstable at the amplifying optical fiber AF. It is also possible to reduce the likelihood that Stokes light and anti-Stokes light will make the amplification of laser light unstable at the amplifying optical fiber AF'.

Alternatively, in a case where the filter device F''' employs the foregoing configuration (c), it is possible to obtain both the effects obtained in the case where the filter device F''' employs the configuration (a) and the effects obtained in the case where the filter device F''' employs the configuration (b).

Note that, in one or more embodiments, arrangements of the laser apparatus 1 can also be employed in the laser apparatus 6. In a case where an arrangement of laser apparatus 1 is employed in the laser apparatus 6, effects corresponding to the employed arrangement are also obtained in the laser apparatus 6. Furthermore, in one or more embodiments, example configurations of the filter device F used in laser apparatus 1 can be employed also in the filter F''' of the laser apparatus 6. In a case where an example configuration of the filter device F used in laser apparatus 1 is employed in the filter device F''' of the laser apparatus 6, effects corresponding to the employed example configuration are also obtained in the laser apparatus 6 in accordance.

[Remarks on One or More Embodiments]

The MO section in each of the arrangements discussed in one or more embodiments is a resonator-type fiber laser apparatus. Note, however, that this does not imply any limitation. Specifically, the MO section may be provided with a seed light source other than the resonator-type fiber laser. The seed light source constituting the MO section can be, for example, a laser diode that emits laser light having a peak wavelength falling within the wavelength range of from 1000 nm to 1100 nm inclusive. A semiconductor laser device other than laser diodes, a solid laser device, a semiconductor laser device, a liquid laser device, or a gas laser device may be used instead of the laser diode.

The MOPA-type fiber laser discussed in each of one or more embodiments is one in which a MO section and a PA section are connected directly. Note, however, that this does not imply any limitation. Specifically, a preamplifier section may be further provided between the MO section and the PA section. The preamplifier section can be, for example, an optical fiber having a core doped with a rare-earth element (i.e., amplifying optical fiber). Use of such a preamplifier section makes it possible to further increase the power of laser light outputted from the laser head LH. Additionally or alternatively, an acousto-optic element (acoustic optic modulation, or AOM) may further be provided between the MO section and the PA section. The acousto-optic element is controlled externally by electric current and is thereby capable of switching between an ON state that allows passage of seed light (light outputted from the MO section) and an OFF state that reflects the seed light. Use of such an acousto-optic element makes it possible to freely control the pulse pattern of laser light outputted from the laser head LH.

One or more embodiments discussed above are resonator-type fiber laser apparatuses or MOPA-type fiber laser apparatuses. Note, however, that the scope of application of the present invention is not limited to fiber laser apparatuses of these types. That is, one or more embodiments of the present invention can be applied to fiber laser apparatuses of any type.

Furthermore, the scope of application of the present invention is not limited to fiber laser apparatuses. Specifically, a laser apparatus including a laser light source and a multi-mode fiber that guides laser light outputted from the laser light source is included within the scope of application of the present invention. Note, here, that the laser light source can be a solid laser device, a semiconductor laser device, a liquid laser device, or a gas laser device. For example, a laser apparatus including a YAG laser (an example of solid laser device) and a multi-mode fiber that guides laser light outputted from the YAG laser is an example of a laser apparatus included within the scope of application of the present invention. In such a laser apparatus, a multi-mode fiber may undergo four-wave mixing in which a plurality of guide modes are involved. Therefore, monitoring the power of at least one of Stokes light and anti-Stokes light resulting from four-wave mixing is effective also in such a laser laser apparatus.

Note that such a laser apparatus carries out a filtering method involving causing a loss of light, belonging to a wavelength range that includes the peak wavelength of at least one of Stokes light and anti-Stokes light (which result from, in a multi-mode fiber which guides laser light, four-wave mixing in which a plurality of guide modes are involved), in preference to light belonging to another wavelength range. Such a filtering method makes it possible, irrespective of whether the method is carried out by such a laser apparatus or not, to reduce the power of at least one of the Stokes light and anti-Stokes light. Such a laser apparatus can be produced by a method including (1) a determining step including determining the peak wavelength of at least one of Stokes light and anti-Stokes light resulting from, in the laser delivery fiber LDF (which is a multi-mode fiber), four-wave mixing in which a plurality of guide modes are involved and (2) a setting step including setting a wavelength range, in which the filter element preferentially cases a loss of light, such that the wavelength range includes the peak wavelength determined in the determining step. The method may include an attaching step including attaching the filter element to the laser apparatus. Such a method makes it possible to produce a laser apparatus that is capable of reducing the power of at least one of Stokes light and anti-Stokes light.

[Effects Provided by Filter Element]

Note that the effects provided by the filter devices F, F', F'', and F''' discussed in the foregoing embodiments can also be regarded as effects provided by filter elements included in the filter devices F, F', F'', and F''', respectively.

One or more embodiments of the present invention can also be expressed as follows.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is configured to cause a loss of light, belonging to a wavelength range that includes a peak wavelength of at least one of Stokes light and anti-Stokes light, in preference to light belonging to another wavelength range, the Stokes light and anti-Stokes light resulting from, in a multi-mode fiber (laser delivery fiber LDF) configured to guide laser light, four-wave mixing in which a plurality of guide modes are involved.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that: in the four-wave mixing, a fundamental mode component and a higher order mode component of the laser light guided through the multi-mode fiber (laser delivery fiber LDF) are involved as pump light; and a peak angular frequency $\omega_s$ of the Stokes light and a peak angular frequency $\omega_{as}$ of the anti-Stokes light satisfy the following equation (1) representing a frequency matching condition and the following equation (2a) or (2b) representing a phase matching condition:

$$\omega_s + \omega_{as} = 2\omega_p \tag{1}$$

$$\beta(\omega_s) + \beta'(\omega_{as}) = \beta'(\omega_p) + \beta(\omega_p) - \gamma(P+P') \tag{2a}$$

$$\delta'(\omega_s) + \beta(\omega_{as}) = \beta'(\omega_p) + \beta(\omega_p) - \gamma(P+P') \tag{2b},$$

where $\beta(\omega)$ represents a propagation constant of the multi-mode fiber (laser delivery fiber LDF) with regard to the fundamental mode component having an angular frequency ω, β'(ω) represents a propagation constant of the multi-mode fiber (laser delivery fiber LDF) with regard to the higher order mode component having an angular frequency ω, $\omega_p$ represents a peak angular frequency of the laser light, P represents power of the fundamental mode component of the laser light, P' represents power of the higher order mode component of the laser light, and γ represents a non-linear coefficient.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that the higher order mode component is LP11 mode.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that: in the four-wave mixing, a first higher mode component and a second higher order mode component of the laser light guided through the multi-mode fiber (laser delivery fiber LDF) are involved as pump light; and a peak angular frequency $\omega_s$ of the Stokes light and a peak angular frequency $\omega_{as}$ of the anti-Stokes light satisfy the following equation (1) representing a frequency matching condition and the following equation (2a') or (2b') representing a phase matching condition:

$$\omega_s + \omega_{as} = 2\omega_p \quad (1)$$

$$\beta'(\omega_s) + \beta''(\omega_{as}) = \beta''(\omega_p) + \beta'(\omega_p) - \gamma(P' + P'') \quad (2a')$$

$$\beta''(\omega_s) + \beta'(\omega_{as}) = \beta''(\omega_p) + \beta'(\omega_p) - \gamma(P' + P'') \quad (2b'),$$

where β'(ω) represents a propagation constant of the multi-mode fiber with regard to the first higher order mode component having an angular frequency ω, β"(ω) represents a propagation constant of the multi-mode fiber with regard to the second higher order mode component having an angular frequency ω, $\omega_p$ represents a peak angular frequency of the laser light, P' represents power of the first higher order mode component of the laser light, P" represents power of the second higher order mode component of the laser light, and γ represents a non-linear coefficient.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that the first higher order mode component or the second higher order mode component is LP11 mode.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that the light belonging to another wavelength range is the laser light.

A filter element (slanted fiber Bragg grating SFBG1, slanted fiber Bragg grating SFBG2, dielectric multilayer film dielectric multilayer film DMF1, dielectric multilayer film DMF2, dielectric multilayer film DMF3) in accordance with one or more embodiments of the present invention is arranged such that the light belonging to another wavelength range is scattered light generated by stimulated Raman scattering of the laser light.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that the peak wavelength of the Stokes light is different from a peak wavelength of scattered light generated by stimulated Raman scattering of the laser light.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is arranged such that the peak wavelength of the Stokes light and the peak wavelength of the anti-Stokes light are different from a peak wavelength of spontaneous emission.

A filter element (slanted fiber Bragg grating SFBG1, slanted fiber Bragg grating SFBG2) in accordance with one or more embodiments of the present invention is a slanted fiber Bragg grating configured to couple, to a cladding, the light belonging to the wavelength range that includes the peak wavelength of at least one of Stokes light and anti-Stokes light in preference to the light belonging to another wavelength range.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is configured to preferentially cause a loss of light belonging to a wavelength range that includes the peak wavelength of the anti-Stokes light and that is shorter in wavelength than a peak wavelength of the laser light.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is configured to preferentially cause a loss of light belonging to a wavelength range that includes the peak wavelength of the Stokes light and that is longer in wavelength than a peak wavelength of the laser light.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is configured to preferentially cause a loss of light belonging to a wavelength range that includes the peak wavelength of the Stokes light and that is longer in wavelength than the peak wavelength of the laser light and is shorter in wavelength than a peak wavelength of scattered light generated by stimulated Raman scattering of the laser light.

A filter element (slanted fiber Bragg grating SFBG1, slanted fiber Bragg grating SFBG2, dielectric multilayer film DMF1, dielectric multilayer film DMF2, dielectric multilayer film DMF3) in accordance with one or more embodiments of the present invention is configured to preferentially cause a loss of light belonging to at least one of the following wavelength ranges i) and ii): i) a wavelength range which is shorter in wavelength than a peak wavelength of the laser light and in which a lower limit is a wavelength shorter by 40 nm than the peak wavelength of the laser light; and ii) a wavelength range which is longer in wavelength than the peak wavelength of the laser light and in which an upper limit is a wavelength longer by 40 nm than the peak wavelength of the laser light.

A laser apparatus (1, 2, 3, 4, 5, 6) in accordance with one or more embodiments of the present invention includes: any of the foregoing filter elements (slanted fiber Bragg grating SFBG1, slanted fiber Bragg grating SFBG2, dielectric multilayer film DMF1, dielectric multilayer film DMF2, dielectric multilayer film DMF3); and the multi-mode fiber (laser delivery fiber LDF).

A laser apparatus (1, 2, 3, 4, 5, 6) in accordance with one or more embodiments of the present invention further includes a reducing section configured to reduce scattered light generated by stimulated Raman scattering of the laser light.

A laser apparatus (1, 2, 3, 4, 5, 6) in accordance with one or more embodiments of the present invention is arranged such that power of the laser light is 3 kW or greater.

A laser apparatus (1, 3) in accordance with one or more embodiments of the present invention further includes an amplifying optical fiber (AF), and is arranged such that the filter element (slanted fiber Bragg grating SFBG1, slanted fiber Bragg grating SFBG2, dielectric multilayer film DMF1, dielectric multilayer film DMF2, dielectric multilayer film DMF3) is located downstream of the amplifying optical fiber (AF).

A laser apparatus (2, 6) in accordance with one or more embodiments of the present invention further includes an amplifying optical fiber (AF), and is arranged such that the filter element (slanted fiber Bragg grating SFBG1, slanted fiber Bragg grating SFBG2, dielectric multilayer film DMF1, dielectric multilayer film DMF2, dielectric multilayer film DMF3) is located upstream of the amplifying optical fiber (AF).

A laser apparatus in accordance with one or more embodiments of the present invention is arranged such that the laser apparatus includes two of the filter elements, one of which is a first filter element (slanted fiber Bragg grating SFBG2) configured to cause a loss of the Stokes light and the other of which is a second filter element (slanted fiber Bragg grating SFBG1) configured to cause a loss of the anti-Stokes light, the first filter element (slanted fiber Bragg grating SFBG2) is located downstream of the second filter element (slanted fiber Bragg grating SFBG1) in a case where the Stokes light is greater in power than the anti-Stokes light, the second filter element (slanted fiber Bragg grating SFBG1) is located downstream of the first filter element (slanted fiber Bragg grating SFBG2) in a case where the anti-Stokes light is greater in power than the Stokes light.

A fiber laser apparatus (1, 2, 3, 4, 5, 6) in accordance with one or more embodiments of the present invention includes: at least one pump light source (PS1 to PSm) configured to emit pump light; at least one pump delivery fiber (PDF1 to PDFm) configured to guide the pump light; an amplifying optical fiber (AF) optically coupled to the at least one pump delivery fiber (PDF1 to PDFm); the multi-mode fiber (laser delivery fiber LDF) optically coupled to the amplifying optical fiber (AF); and a filter element (slanted fiber Bragg grating SFBG1, slanted fiber Bragg grating SFBG2, dielectric multilayer film DMF1, dielectric multilayer film DMF2, dielectric multilayer film DMF3) in accordance with any of the embodiments of the present invention, the filter element (slanted fiber Bragg grating SFBG1, slanted fiber Bragg grating SFBG2, dielectric multilayer film DMF1, dielectric multilayer film DMF2, dielectric multilayer film DMF3) being located (1) between the at least one pump delivery fiber and the amplifying optical fiber, (2) between the amplifying optical fiber and the multi-mode fiber, or (3) at the multi-mode fiber.

A filtering method in accordance with one or more embodiments of the present invention includes a filtering step including causing a loss of light, belonging to a wavelength range that includes a peak wavelength of at least one of Stokes light and anti-Stokes light, in preference to light belonging to another wavelength range, the Stokes light and anti-Stokes light resulting from, in a multi-mode fiber (laser delivery fiber LDF) configured to guide laser light, four-wave mixing in which a plurality of guide modes are involved.

A method of producing a laser apparatus in accordance with one or more embodiments of the present invention is a method of producing a laser apparatus that includes (i) a multi-mode fiber (laser delivery fiber LDF) configured to guide laser light and (ii) a filter element (slanted fiber Bragg grating SFBG1, slanted fiber Bragg grating SFBG2, dielectric multilayer film DMF1, dielectric multilayer film DMF2, dielectric multilayer film DMF3) configured to cause a loss of light belonging to a specific wavelength range in preference to light belonging to another wavelength range, the method including: a) determining a peak wavelength of at least one of Stokes light and anti-Stokes light resulting from, in the multi-mode fiber (laser delivery fiber LDF), four-wave mixing in which a plurality of guide modes are involved; and b) setting the specific wavelength range, in which the filter preferentially causes a loss of light, such that the specific wavelength range includes the peak wavelength determined in step a).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1, 2, 3, 4, 5, 6 laser apparatus
PS1 to PSm pump light source
PDF1 to PDFm pump delivery fiber
PC pump combiner
AF amplifying optical fiber
FBG1 to FBG2 fiber Bragg grating
LDF laser delivery fiber
LH laser head
F, F', F'', F''' filter device

The invention claimed is:
1. A fiber laser apparatus comprising:
a pump light source that emits pump light;
a pump delivery fiber that guides the pump light;
an amplifying optical fiber that is optically coupled to the pump delivery fiber and guides laser light; and
a filter element that causes more loss of light of a wavelength range that includes a peak wavelength of at least one of Stokes light and anti-Stokes light than the laser light, wherein
the Stokes light and anti-Stokes light result from four-wave mixing involving a plurality of guide modes in a multi-mode fiber that guides the laser light, and
the filter element is disposed:
   between the pump delivery fiber and the amplifying optical fiber,
   between the amplifying optical fiber and the multi-mode fiber, or
   at the multi-mode fiber.

2. The fiber laser apparatus as set forth in claim 1, wherein:
in the four-wave mixing, a fundamental mode component and a higher order mode component of the laser light guided through the multi-mode fiber are involved as pump light; and
a peak angular frequency $\omega_s$ of the Stokes light and a peak angular frequency $\omega_{as}$ of the anti-Stokes light satisfy equation (1) representing a frequency matching condition and the following equation (2a) or (2b) representing a phase matching condition:

$$\omega_s + \omega_{as} = 2\omega_p \qquad (1)$$

$$\beta(\omega_s) + \beta'(\omega_{as}) = \beta'(\omega_p) + \beta(\omega_p) - \gamma(P+P') \qquad (2a)$$

$$\beta'(\omega_s) + \beta(\omega_{as}) = \beta'(\omega_p) + \beta(\omega_p) - \gamma(P+P') \qquad (2b),$$

where:
$\beta(\omega)$ represents a propagation constant of the multi-mode fiber with regard to the fundamental mode component and $\beta'(\omega)$ represents a propagation constant of the multi-mode fiber with regard to the higher order mode component where $\omega$ is an angular frequency,
$\omega_p$ represents a peak angular frequency of the laser light,
P represents power of the fundamental mode component of the laser light,
P' represents power of the higher order mode component of the laser light, and
$\gamma$ represents a non-linear coefficient.

3. The fiber laser apparatus as set forth in claim 2, wherein the higher order mode component is an LP11 mode.

4. The fiber laser apparatus as set forth in claim 1, wherein:
in the four-wave mixing, a first higher mode component and a second higher order mode component of the laser light guided through the multi-mode fiber are involved as pump light; and
a peak angular frequency $\omega_s$ of the Stokes light and a peak angular frequency $\omega_{as}$ of the anti-Stokes light satisfy equation (1) representing a frequency matching condition and equation (2a') or (2b') representing a phase matching condition:

$$\omega_s + \omega_{as} = 2\omega_p \qquad (1)$$

$$\beta'(\omega_s) + \beta''(\omega_{as}) = \beta''(\omega_p) + \beta'(\omega_p) - \gamma(P'+P'') \qquad (2a')$$

$$\beta''(\omega_s) + \beta'(\omega_{as}) = \beta''(\omega_p) + \beta'(\omega_p) - \gamma(P'+P'') \qquad (2b'),$$

where:
$\beta'(\omega)$ represents a propagation constant of the multi-mode fiber with regard to the first higher order mode component and $\beta''(\omega)$ represents a propagation constant of the multi-mode fiber with regard to the second higher order mode component where $\omega$ is an angular frequency,
$\omega_p$ represents a peak angular frequency of the laser light,
P' represents power of the first higher order mode component of the laser light,
P'' represents power of the second higher order mode component of the laser light, and
$\gamma$ represents a non-linear coefficient.

5. The fiber laser apparatus as set forth in claim 4, wherein the first higher order mode component or the second higher order mode component is an LP11 mode.

6. The fiber laser apparatus as set forth in claim 1, wherein the filter element is a slanted fiber Bragg grating that couples, to a cladding, more of the light of the wavelength range that includes the peak wavelength of the at least one of Stokes light and anti-Stokes light than the laser light.

7. The fiber laser apparatus as set forth in claim 1, wherein the filter element causes a loss of light of a wavelength range that:
includes the peak wavelength of the anti-Stokes light, and
is shorter in wavelength than a peak wavelength of the laser light.

8. The fiber laser apparatus as set forth in claim 1, wherein the filter element causes a loss of light of a wavelength range that:
includes the peak wavelength of the Stokes light, and
is longer in wavelength than a peak wavelength of the laser light.

9. The fiber laser apparatus as set forth in claim 8, wherein the filter element causes a loss of light of a wavelength range that:
includes the peak wavelength of the Stokes light,
is longer in wavelength than the peak wavelength of the laser light, and
is shorter in wavelength than a peak wavelength of scattered light generated by stimulated Raman scattering of the laser light.

10. The fiber laser apparatus as set forth in claim 1, wherein the filter element causes a loss of light of at least one of the following:
a first wavelength range shorter in wavelength than a peak wavelength of the laser light where a lower limit of the first wavelength range is shorter than the peak wavelength of the laser light by 40 nm; and
a second wavelength range longer in wavelength than the peak wavelength where an upper limit of the second wavelength range is longer than the peak wavelength of the laser light by 40 nm.

11. The fiber laser apparatus as set forth in claim 1, wherein a power of the laser light is 3 kW or greater.

12. The fiber laser apparatus as set forth in claim 1, further comprising:
two of the filter elements including a first filter element that causes loss of the Stokes light and a second filter element that causes loss of the anti-Stokes light, wherein
the first filter element is downstream of the second filter element when the Stokes light is greater in power than the anti-Stokes light,
the second filter element is downstream of the first filter element when the anti-Stokes light is greater in power than the Stokes light.

13. A filtering method comprising:
causing more loss of light of a wavelength range that includes a peak wavelength of at least one of Stokes light and anti-Stokes light than a laser light, wherein
the Stokes light and anti-Stokes light result from four-wave mixing involving a plurality of guide modes in a multi-mode fiber that guides the laser light.

14. A method of producing a laser apparatus that includes a multi-mode fiber that guides laser light and a filter element that causes more loss of light of a specific wavelength range than the laser light, the method comprising:
determining a peak wavelength of at least one of Stokes light and anti-Stokes light resulting from four-wave mixing involving a plurality of guide modes in the multi-mode fiber; and setting the specific wavelength range to include the peak wavelength determined in the determining of the peak wavelength of the at least one of the Stokes light and the anti-Stokes light.

* * * * *